US009478796B2

(12) United States Patent
Li et al.

(10) Patent No.: US 9,478,796 B2
(45) Date of Patent: Oct. 25, 2016

(54) GRAPHENE-CONTAINING ELECTRODES

(71) Applicant: Academia Sinica, Nangkang Taipei (TW)

(72) Inventors: Lain-Jong Li, Hsin-Chu (TW); Lung-Hao Hu, New Tapei (TW); Cheng-Te Lin, Taoyuan (TW); Feng-Yu Wu, Tapei (TW)

(73) Assignee: Academia Sinica (TW)

( * ) Notice: Subject to any disclaimer, the term of this patent is extended or adjusted under 35 U.S.C. 154(b) by 665 days.

(21) Appl. No.: 13/800,096

(22) Filed: Mar. 13, 2013

(65) Prior Publication Data
US 2014/0023926 A1    Jan. 23, 2014

(30) Foreign Application Priority Data

Jul. 20, 2012   (TW) .............................. 101126393 A

(51) Int. Cl.
| | | |
|---|---|---|
| H01M 4/133 | (2010.01) | |
| H01M 4/13 | (2010.01) | |
| H01M 4/139 | (2010.01) | |
| H01M 4/36 | (2006.01) | |
| H01M 4/62 | (2006.01) | |
| C01B 31/04 | (2006.01) | |

(52) U.S. Cl.
CPC ............ *H01M 4/133* (2013.01); *H01M 4/13* (2013.01); *H01M 4/139* (2013.01); *H01M 4/366* (2013.01); *H01M 4/625* (2013.01); *C01B 31/0484* (2013.01); *Y02E 60/122* (2013.01)

(58) Field of Classification Search
CPC ........... H01L 29/1606; C01B 31/0446; C01B 31/0438; C01B 31/0469; C01B 31/0484; B82Y 30/00
See application file for complete search history.

(56) References Cited

U.S. PATENT DOCUMENTS

| | | | |
|---|---|---|---|
| 2002/0122980 A1 | 9/2002 | Fleischer et al. | |
| 2009/0026086 A1 | 1/2009 | Zhamu et al. | |
| 2010/0015516 A1 | 1/2010 | Jiang | |
| 2011/0123866 A1* | 5/2011 | Pan .......................... | H01M 2/16 429/221 |
| 2011/0165466 A1 | 7/2011 | Zhamu et al. | |
| 2011/0183180 A1 | 7/2011 | Yu et al. | |
| 2011/0292570 A1 | 12/2011 | Ivanovici et al. | |
| 2012/0058397 A1 | 3/2012 | Zhamu et al. | |
| 2012/0064409 A1* | 3/2012 | Zhamu .................... | B82Y 30/00 429/221 |

(Continued)

FOREIGN PATENT DOCUMENTS

| | | |
|---|---|---|
| CN | 101562248 | 10/2009 |
| GB | WO2012/120264 | * 3/2012 |
| WO | WO 2012/091498 | 7/2012 |

OTHER PUBLICATIONS

International Search Report and Written Opinion for App. Ser. No. PCT/US2013/051078, mailed Dec. 13, 2013.

(Continued)

*Primary Examiner* — Ula C Ruddock
*Assistant Examiner* — Lisa S Park
(74) *Attorney, Agent, or Firm* — Fish & Richardson P.C.

(57) ABSTRACT

A battery includes a first electrode including a plurality of particles containing lithium, a layer of carbon at least partially coating a surface of each particle, and electrochemically exfoliated graphene at least partially coating one or more of the plurality of particles. The battery includes a second electrode and an electrolyte. At least a portion of the first electrode and at least a portion of the second electrode contact the electrolyte.

28 Claims, 24 Drawing Sheets

(56) References Cited

U.S. PATENT DOCUMENTS

| | | |
|---|---|---|
| 2012/0098032 A1 | 4/2012 | Guo et al. |
| 2012/0100402 A1 | 4/2012 | Nesper et al. |
| 2012/0145234 A1 | 6/2012 | Roy-Mayhew et al. |
| 2012/0164534 A1 | 6/2012 | Choi et al. |
| 2013/0001089 A1* | 1/2013 | Li .................... B82Y 40/00 205/106 |
| 2014/0166500 A1* | 6/2014 | Cheng ............... C01B 31/0446 205/768 |

OTHER PUBLICATIONS

Su, C.Y. et al., "High Quality Thin Graphene Films from Fast Electrochemical Exfoliation," ACS Nano (2011), vol. 5, No. 3, pp. 2332-2339.

Office Action issued in Chinese Application No. 201210254481.X, dated Jan. 7, 2015, 8 pages.

Office Action issued in Chinese Application No. 201210254481.X, dated Sep. 18, 2015, 6 pages.

\* cited by examiner

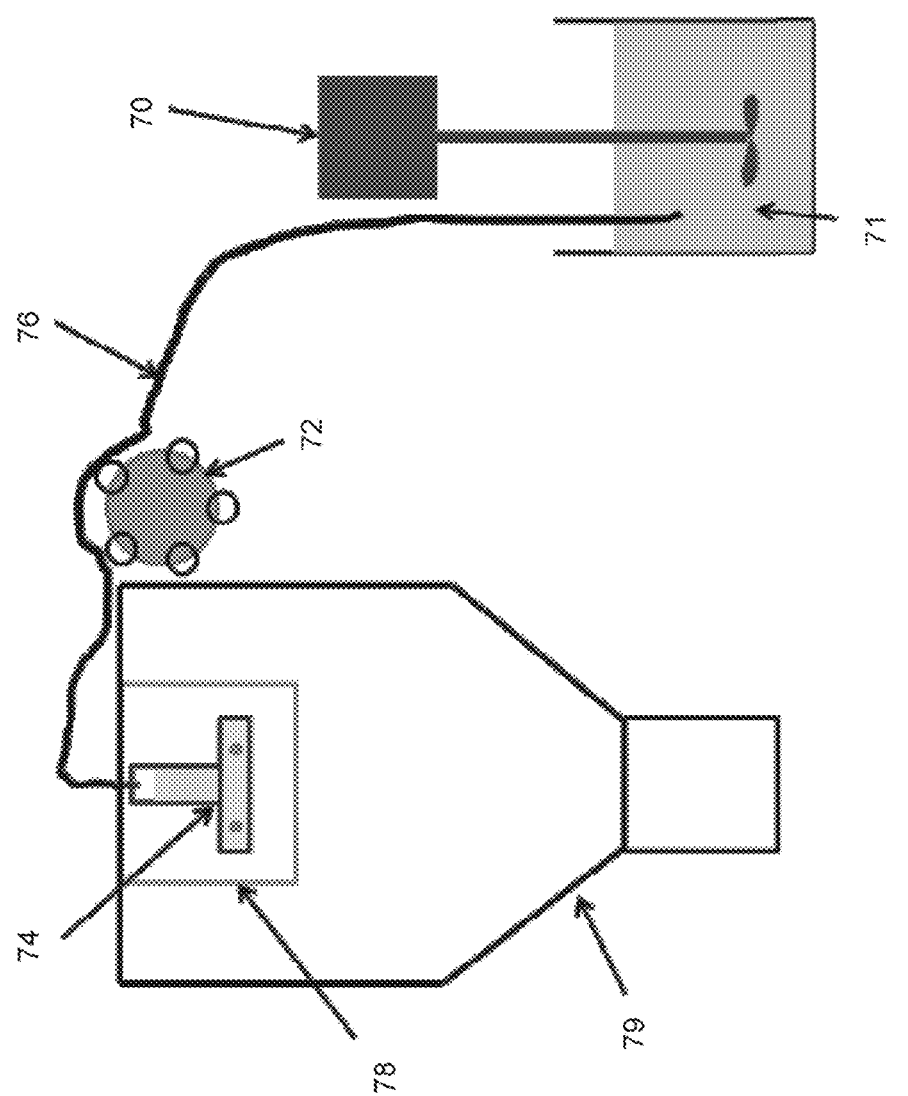

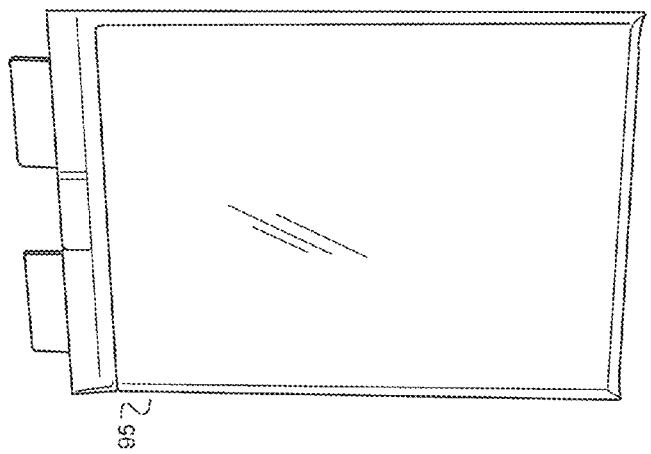
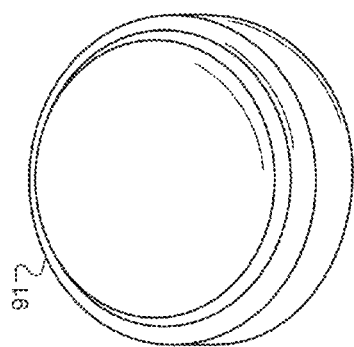
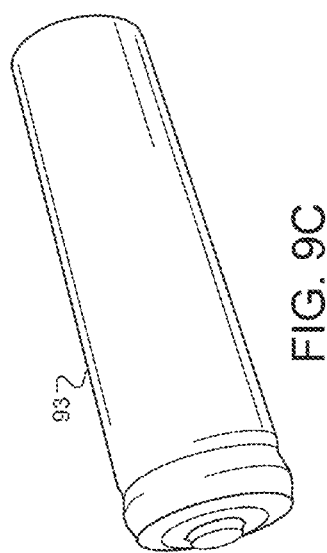

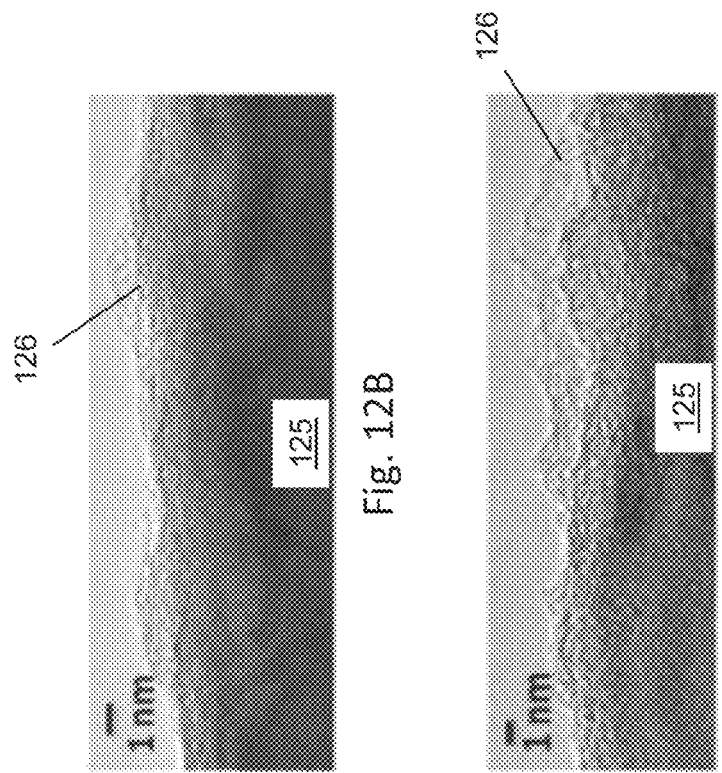
Fig. 12B
Fig. 12C
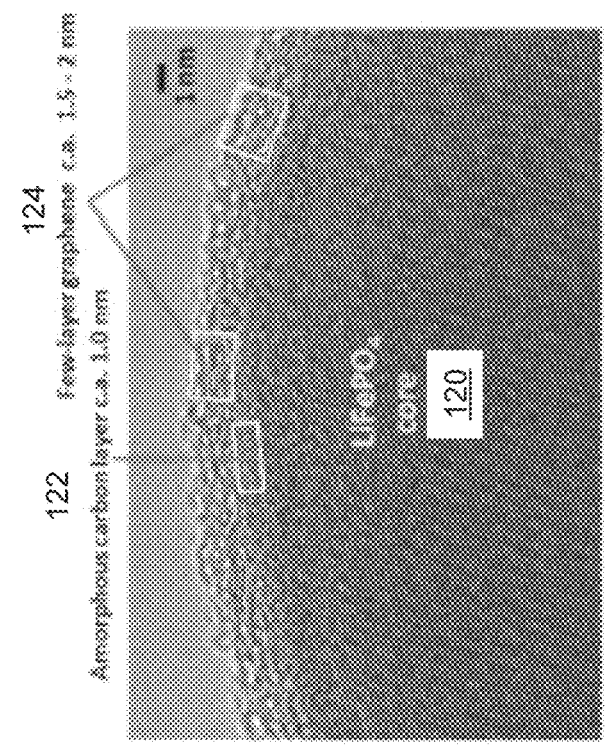
Fig. 12A

GRAPHENE-CONTAINING ELECTRODES

CROSS-REFERENCE TO RELATED APPLICATIONS

This application claims priority to Taiwan Patent Application No. 101126393, filed on Jul. 20, 2012, the entire contents of which are hereby incorporated by reference.

BACKGROUND

Lithium ion batteries provide good electrochemical performance and high capacity and are used as energy storage devices for a variety of applications, such as solar energy, wind energy, hydroelectricity, and electric cars. The demand for higher capacity storage can be met by improving the rate capability and energy density of lithium ion batteries. For example, to enhance the electrochemical performance of lithium ion batteries having lithium iron phosphate cathodes, the cathodes can be coated with carbon, doped with metal, and/or formed of small particles.

SUMMARY

A battery incorporating an amorphous carbon-coated lithium iron phosphate electrode, such as an anode or cathode, loaded with electrochemically exfoliated graphene exhibits high specific capacity, high energy density, and high power, without significant voltage polarization. Such a battery also exhibits a low first cycle irreversible loss of capacity and a long cycle lifetime.

In a general aspect, a battery includes a first electrode including a plurality of particles containing lithium; a layer of carbon at least partially coating a surface of each particle; and electrochemically exfoliated graphene at least partially coating one or more of the plurality of particles. The battery includes a second electrode; and an electrolyte. At least a portion of the first electrode and at least a portion of the second electrode contact the electrolyte.

Implementations of the battery may include one or more of the following. The first electrode can be a cathode or an anode. The battery can be, e.g., a coin cell battery, a cylindrical battery, or a pouch cell battery. The particles can include lithium iron phosphate, lithium iron oxide, lithium iron phosphorous oxide, lithium cobalt oxide, lithium manganese oxide, lithium nickel oxide, lithium cobalt manganese nickel, or lithium cobalt manganese nickel oxide. The electrochemically exfoliated graphene can include flakes of electrochemically exfoliated graphene disposed on the carbon. The electrochemically exfoliated graphene can form about 0.001 wt % to about 5 wt % of the electrode.

In a general aspect, an electrode material includes a plurality of particles containing lithium; a layer of carbon at least partially coating a surface of each particle; and electrochemically exfoliated graphene at least partially coating one or more of the plurality of particles.

Implementations of the electrode material may include one or more of the following. The particles can include lithium iron phosphate, lithium iron oxide, lithium iron phosphorous oxide, lithium cobalt oxide, lithium manganese oxide, lithium nickel oxide, lithium cobalt manganese nickel, or lithium cobalt manganese nickel oxide. The layer of carbon can include a layer of amorphous carbon. The electrochemically exfoliated graphene can include a plurality of flakes of electrochemically exfoliated graphene disposed on the carbon. The electrochemically exfoliated graphene can form about 0.001 wt % to about 5 wt % of the electrode material. A specific capacity of the electrode material can be at least about 180 mAh/g, such as about 210 mAh/g. The electrochemically exfoliated graphene can include less than about 20 wt % oxygen. A permeability of the electrochemically exfoliated graphene can be less than about 90% and a sheet resistance is less than about 10 k$\Omega$/sq. The electrode material can include an additive material including a conductive additive material, a bonding agent, a carbon material, or a solvent. In some examples, the carbon material can include graphite, soft carbon, hard carbon, carbon nanotubes, or carbon fibers. The electrode material can include sulfur, silicon, tin, ceramic materials, or lithium sulfide. The electrode material can include a transition metal dichalcogenide. The electrode material can include triazine or thiophene. The electrode material can be a cathode material or an anode material.

In a general aspect, a method of making an electrode material includes providing plurality of particles containing lithium and having a layer of carbon coating at least a portion of a surface of each particle; and disposing electrochemically exfoliated graphene among the plurality of particles. The electrochemically exfoliated graphene at least partially coats one or more of the plurality of particles.

Implementations of the method may include one or more of the following. The particles can include lithium iron phosphate, lithium iron oxide, lithium iron phosphorous oxide, lithium cobalt oxide, lithium manganese oxide, lithium nickel oxide, lithium cobalt manganese nickel, or lithium cobalt manganese nickel oxide. The layer of carbon can include a layer of amorphous carbon. Disposing electrochemically exfoliated graphene among the plurality of particles can include mechanically mixing the particles and the electrochemically exfoliated graphene, performing physical or chemical surface modification of the plurality of particles with the electrochemically exfoliated graphene, or doping the plurality of particles with the electrochemically exfoliated graphene. The method can include forming the electrochemically exfoliated graphene. In some examples, forming the electrochemically exfoliated graphene can include immersing a portion of a first electrode including a first carbon material and a portion of a second electrode in a solution containing an electrolyte, and generating an electric potential between the first and second electrodes.

The approaches described herein may have one or more advantages. The fabrication of amorphous carbon-coated lithium iron phosphate electrodes loaded with electrochemically exfoliated graphene is simple, scalable, and compatible with existing processing methods and materials. Furthermore, the performance of a lithium ion battery incorporating an amorphous carbon-coated lithium iron phosphate electrode loaded with electrochemically exfoliated graphene can be improved with only a small amount of electrochemically exfoliated graphene.

Other features and advantages are apparent from the following description and from the claims.

BRIEF DESCRIPTION OF DRAWINGS

FIG. 7 is a diagram of a spray-drying process.

FIG. 9B is a diagram of an example coin cell battery.

FIG. 9C is a diagram of an example cylindrical battery.

FIG. 9D is a diagram of an example prismatic pouch cell battery.

FIG. 12A is a transmission electron microscopy image of a lithium iron phosphate-electrochemical graphene material after charging.

FIGS. 12B and 12C are transmission electron microscopy images of a lithium iron phosphate-electrochemical graphene material after discharging.

DETAILED DESCRIPTION

A battery incorporating an amorphous carbon-coated lithium iron phosphate electrode, such as an anode or cathode, including electrochemically exfoliated graphene exhibits high specific capacity, high energy density, and high power, without significant voltage polarization. For instance, the anode or cathode may be formed of lithium-containing particles loaded with (i.e., at least partially coated with) electrochemically exfoliated graphene. Such a battery also exhibits a low first cycle irreversible loss of capacity and a long cycle lifetime.

Electrochemically Exfoliated Graphene

Flakes of electrochemically exfoliated graphene (referred to herein as electrochemical graphene) can be prepared by electrochemical exfoliation of graphite in an electrolyte solution, e.g., as described in U.S. patent application Ser. No. 13/170,624, filed on Jun. 28, 2011; and in Republic of China Patent Application No. 100115655, filed on May 4, 2011, the contents of both of which are incorporated herein by reference. Large quantities of electrochemical graphene flakes can be prepared by electrochemical exfoliation and a large percentage of the flakes that are produced are only a few layers thick, have a high quality crystal structure with a low defect density, and have low electrical resistance.

Figure 1B:
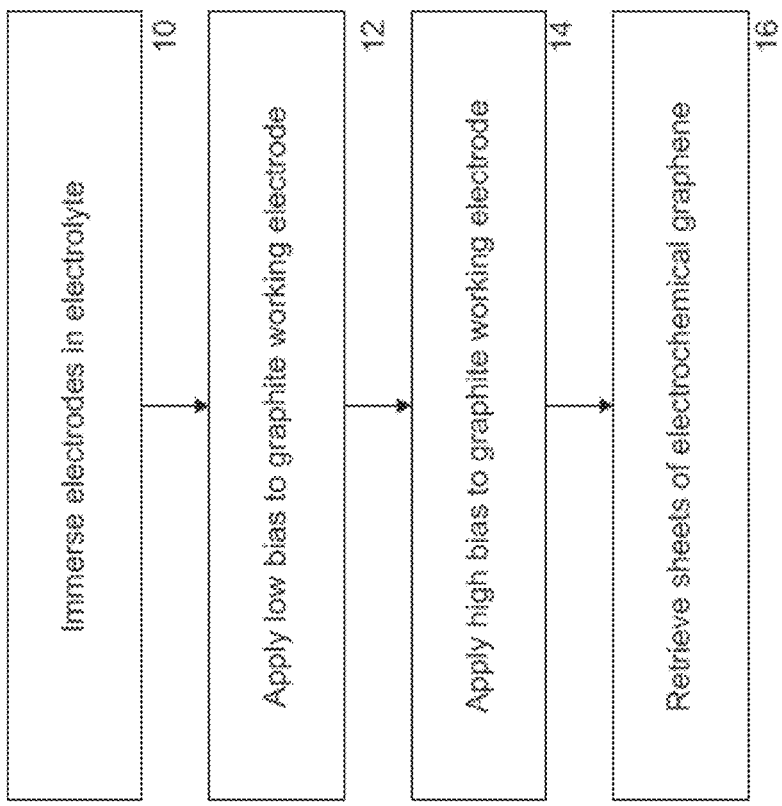
FIG. 1B is a flow chart of a process for preparing electrochemical graphene.
Figure 1A:
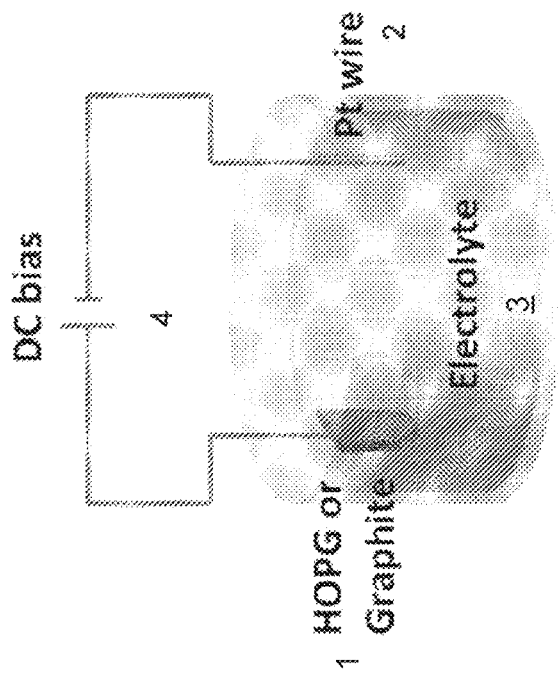
FIG. 1A is a diagram of an experimental setup for preparing electrochemical graphene.

Referring to FIGS. 1A and 1B, to prepare electrochemical graphene, a working electrode 1 and a grounded electrode 2 are immersed in an electrolyte 3 (10). For example, the working electrode can be made of graphite and the grounded electrode can be made of a metal, such as platinum. A low bias voltage (e.g., +2.5 V) from a voltage source 4 is applied to the working electrode 1 (12) to cause ions from the electrolyte 3 to intercalate into the graphitic structure of the working electrode 1. A high bias voltage (e.g., +10 V) from the voltage source 4 is then applied to the working electrode 1 (14) to cause dissociation of the graphite in the working electrode 1, generating thin sheets of graphene, also referred to as graphene flakes. The thin sheets of graphene can be retrieved, e.g., by filtration and/or centrifugation (16). In some examples, the electrochemical graphene flakes can be further processed or modified, e.g., by physically or chemically doping or otherwise mixing with nitrogen or other non-carbon elements. For example, the electrochemical graphene flakes can be p-doped using nitric acid or hydrogen peroxides or n-doped using an amine-containing compound.

In one example of an electrochemical exfoliation process, the working electrode was a graphite rod and the grounded electrode was a platinum wire. An aqueous solution of $SO_4^{2-}$ (2.4 g of 98% sulfuric acid ($H_2SO_4$) in 100 mL of deionized (DI) water with 11 mL of 30% potassium hydroxide solution to cause the pH of the solution to be about 12) was used as an electrolyte. A static bias voltage of +2.5 V was applied to the working electrode for five to ten minutes to wet the graphite rod, causing gentle intercalation of $SO_4^{2-}$ ions into the grain boundaries of the graphite. After application of the +2.5 V bias voltage, the graphite rod remained in a single piece. A bias voltage of +10 V was then applied. For example, applying a bias voltage of +10 V for about 30 minutes can result in the generation of milligrams of graphene to induce graphene exfoliation. Upon application of the +10 V bias voltage, the graphite quickly dissociated into thin sheets that spread on the surface of the electrolyte solution. The exfoliated graphene sheets and related products were collected by filtration and re-dispersed in dimethylformamide (DMF). The graphene solution in dimethylformamide was centrifuged to remove unwanted thick graphite particles. In some examples, the high bias voltage applied to the working electrode can be switched between +10 V and −10 V in order to reduce the oxidation of the exfoliated graphene layers by sulfuric acid.

Figure 2A:
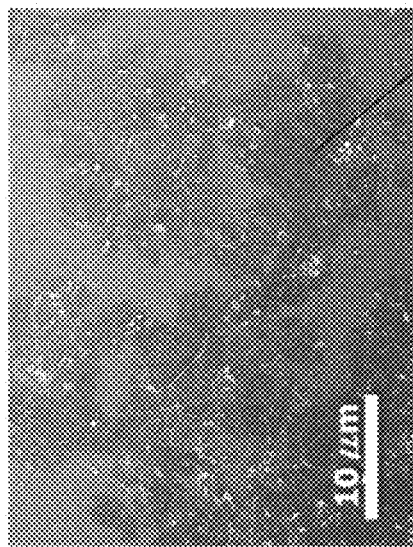
FIGS. 2A, 2B, and 2C are optical microscopy, scanning electron microscopy, and atomic force microscopy images, respectively, of flakes of electrochemical graphene.
Figure 2C:
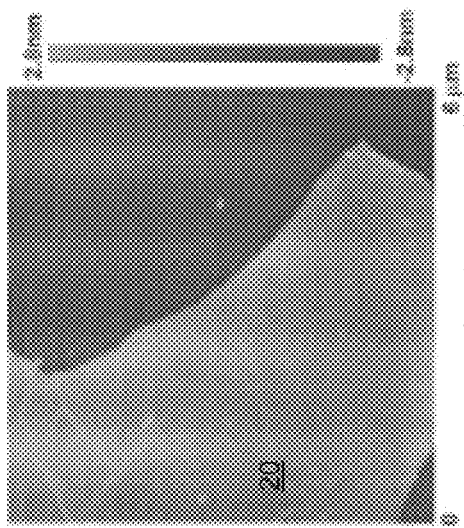
Figure 2B:
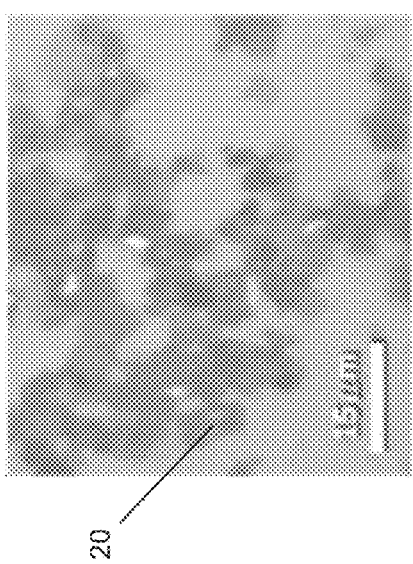

Referring to FIGS. 2A, 2B, and 2C, an optical micrograph, a scanning electron microscopy image, and an atomic force microscopy (AFM) image, respectively, show example graphene flakes 20. The lateral size of the graphene flakes ranges from a few microns to several tens of microns.

Figure 3:
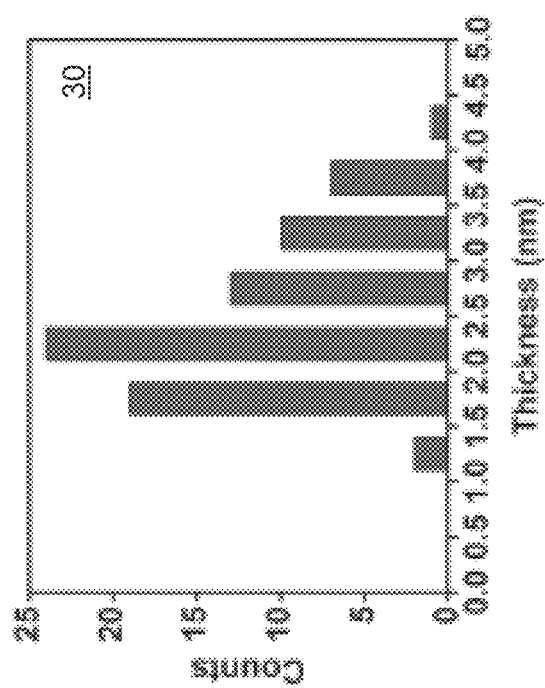
FIG. 3 is a plot of statistical measurements of the thickness of flakes of electrochemical graphene.

Referring to FIG. 3, the thickness of the graphene flakes, as measured by atomic force microscopy, ranges from about 1.5 to 4.2 nm, with an average thickness of about 2.5 nm, as shown in a plot 30. Atomic force microscopy imaging was performed with a Veeco Dimension-Icon® system (Lowell, Mass.).

Figure 4A:
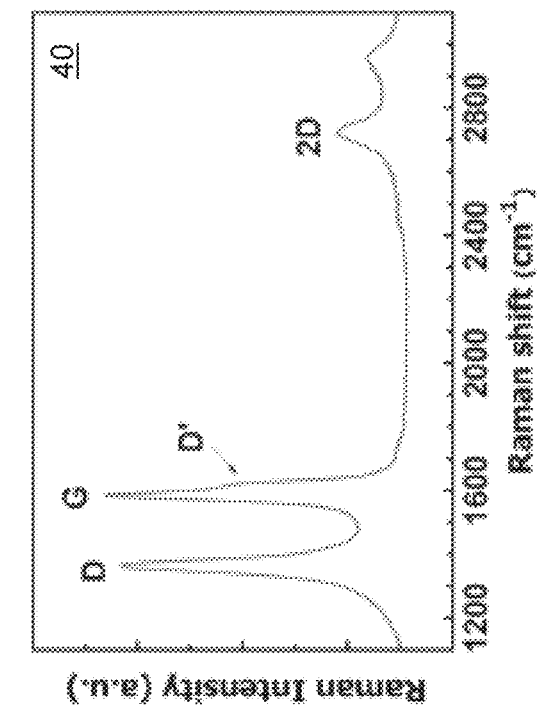
FIGS. 4A and 4B are Raman and X-ray photoemission spectra, respectively, of flakes of electrochemical graphene.
Figure 4B:
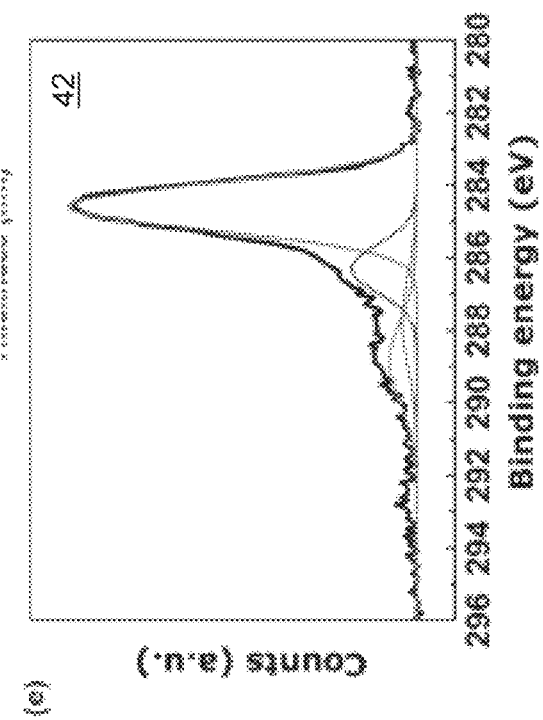

Referring to FIG. 4A, an example Raman spectrum 40 (excited by a 473 nm laser) of electrochemical graphene flakes reveals the presence of Raman D and D' bands. Referring also to FIG. 4B, an example binding energy profile (C1s) 42 of electrochemical graphene flakes, measured by X-ray photoemission spectroscopy (XPS), shows C1s binding energies at 286.4 eV (corresponding to a C—OH bond), 287.8 eV (corresponding to a C=O bond) and 288.9 eV (corresponding to a O=C—OH bond). The Raman spectrum 40 and binding energy profile 42 indicate that some defects are present in the electrochemical graphene flakes, e.g., due to the oxidation of graphene by sulfuric acid. However, the presence of a sharp 2D band at 2700 cm$^{-1}$ in the Raman spectrum indicates that, despite the presence of defects, the graphene flakes have a good quality graphitic crystal structure that can be of better quality than the graphitic structure of graphene oxide or reduced graphene oxide sheets.

Raman spectroscopy was performed in a confocal Raman system (NT-MDT, Santa Clara, Calif.). The wavelength of the laser was 473 nm (2.63 eV), the spot size of the laser beam was about 0.5 μm, and the spectral resolution was 3 cm$^{-1}$ obtained with a grating with 600 grooves per millimeter. A high grating (1800 grooves per millimeter) providing a spectral resolution of 1 cm$^{-1}$ was also used to acquire more details of the line shapes of the Raman bands. The Si peak at 520 cm$^{-1}$ was used as a reference for wave number calibration.

The oxygen content of electrochemical graphene is lower than the oxygen content of other types of graphene, such as chemically exfoliated graphene, mechanically exfoliated graphene, and graphene formed from reduction of graphene oxides. Thus, electrochemical graphene has a higher electrical conductivity than the other types of graphene. For example, the oxygen content of the electrochemical graphene flakes described herein can be less than about 20 wt %, e.g., less than about 18%, less than about 16%, less than about 13%, or in the range from about 2% to about 18%, from about 4% to about 16%, from about 6% to about 14%, or from about 8% to about 12%. The permeability of electrochemical graphene is greater than about 90%, e.g., greater than about 91%, 93%, 95%, 97%, or 99%. The sheet resistance of an electrochemical graphene flake having a thickness between about 1.5 nm and about 5 nm (e.g., from about 1.5 nm to about 3 nm, from about 2 nm to about 4 nm, from about 2.5 nm to about 4.5 nm, or from about 3 nm to about 5 nm) is less than about 10 kΩ/sq, e.g., less than about 9 kΩ/sq, less than about 8 kΩ/sq, less than about 7 kΩ/sq, less than about 6 kΩ/sq, less than about 5 kΩ/sq, less than about 4 kΩ/sq, less than about 3 kΩ/sq.

Electrode Composition and Fabrication

Figure 5:
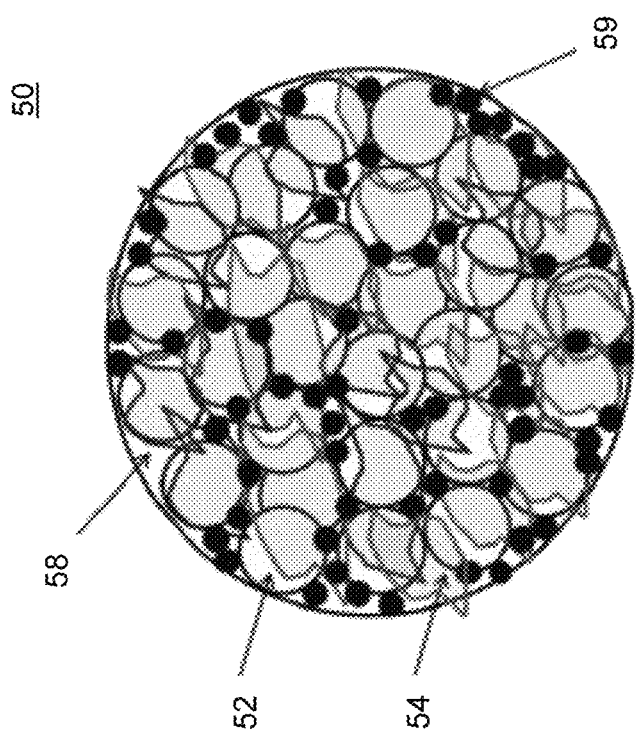
FIG. 5 is a diagram of an electrode including electrochemical graphene.

Referring to FIG. 5, an example composite electrode 50 is formed of an electrode material 52 (e.g., particles of the electrode material), electrochemical graphene 54 intercalated into the electrode material 52, a bonding agent 58, and a conductive additive 59. The electrode 50 can be used as an anode and/or a cathode for a battery, such as a lithium ion battery, which can be, e.g., a coin cell battery, a cylindrical battery, or a prismatic pouch cell battery, as shown in FIGS. 9B-9D, respectively.

In some examples, the electrode material 52 can be a lithium-based material and can be used for the anode and/or the cathode for a lithium ion battery. For example, the electrode material or a precursor that can be transformed into an electrode material can be, e.g., a lithium-based material (e.g., LiFe$_{(1-x)}$M$_x$P$_{(1-x)}$O$_{2(2-x)}$, 0≤X≤1), such as lithium iron oxide, lithium iron phosphate (LiFePO$_4$), lithium iron phosphorous oxide, lithium cobalt oxide (LiCoO$_2$), lithium manganese oxide (LiMn$_2$O$_4$), lithium nickel oxide (LiNiO$_2$), lithium cobalt manganese nickel, or lithium cobalt manganese nickel oxide. The lithium-based material can be coated with a coating, such as an amorphous carbon coating. For example, an example electrode material includes amorphous carbon-coated lithium iron phosphate particles.

In some examples, the electrode material 52 can include, e.g., one or more of a carbon material, a ceramic material, silicon, tin, other metals, or metal oxides. The carbon material can be, e.g., one or more of natural or artificial graphite, soft carbon, hard carbon, carbon nanotubes, or carbon fibers (e.g., vapor grown carbon fibers).

The composite electrode 50 can also include additive materials, such as one or more of conductive additives 59, bonding agents 58, carbon materials, and solvents. The conductive additives 59 can include, e.g., one or more of conductive carbon black (e.g., Super P® carbon black, Timcal, Switzerland), primary synthetic graphite (e.g., Timrex® KS 6 graphite, Timcal), or another conductive additive. The bonding agents 58 can include, e.g., one or more of polyvinyl fluoride, carboxylmethyl cellulose, styrene butadiene copolymer, or another bonding agent. The carbon materials can include functional carbon materials such as, e.g., one or more of natural or artificial graphite, soft carbon, hard carbon, conducting carbon material, carbon nanotubes, carbon fibers (e.g., vapor grown carbon fibers), or another carbon material. The solvent can be, e.g., one or more of N-methyl-2-pyrrolidone, dimethyl phthalate, acetonitrile, alcohol, or other solvents.

In general, the quantity of electrochemical graphene 54 in the composite electrode 50 accounts for a very small portion of the total material of the electrode 100. For example, the composite electrode 50 can have about 0.001 wt % to about 5 wt % of electrochemical graphene 54, e.g., about 0.001 wt % to about 2 wt %, about 0.01 wt % to about 1 wt %, about 0.05 wt % to about 1.5 wt %, or about 0.03 wt % to about 1.2 wt %. As discussed in greater detail below, even such small quantities of electrochemical graphene in the electrode can cause a lithium ion battery using such an electrode to achieve good electrochemical charging and discharging performance.

Figure 6:
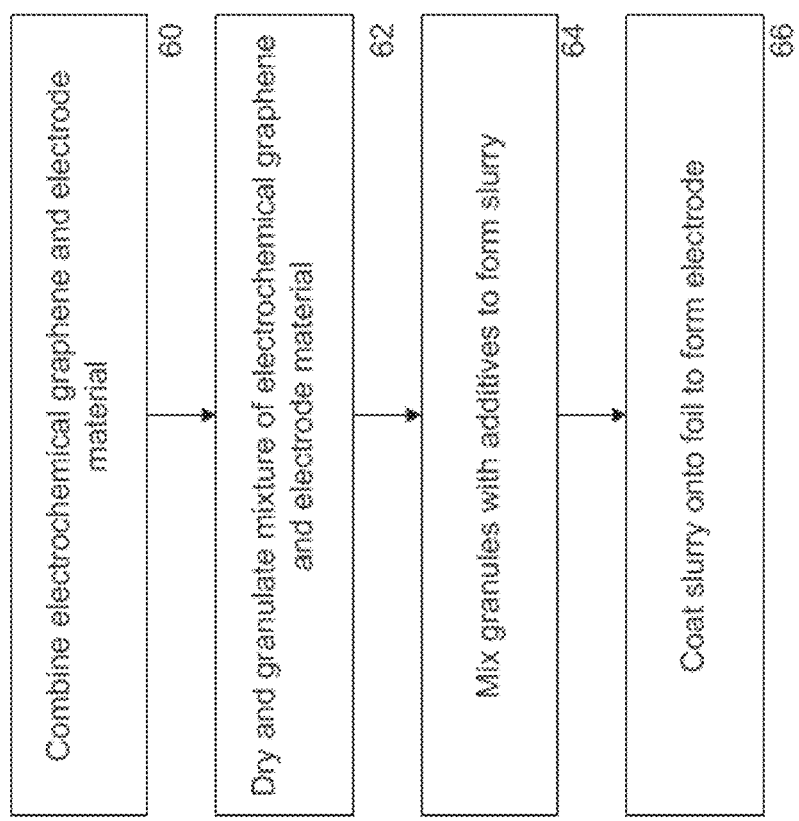
FIG. 6 is a flow chart of a process for preparing an electrode.

Referring to FIG. 6, to prepare a composite electrode, such as an anode or a cathode, loaded with electrochemical graphene, the electrochemical graphene is combined with the electrode material or its precursor (60). For example, the electrochemical graphene and the electrode material or precursor can be mechanically mixed, such as via ultrasonication or homogenous mixing. The electrochemical graphene can also be combined with the electrode material or its precursor via mechanical mixing, solution mixing and drying, physical or chemical surface modification, and/or physical or chemical doping of cathode or anode surfaces.

The mixture of electrochemical graphene and the electrode material can be dried and granulated (62), e.g., by heat drying, spray drying, or filter drying. Heat drying can include, e.g., evaporating solvent from the mixture in a drying oven or on a heating plate and retaining a powder of the electrochemical graphene mixed with the electrode material. Spray drying can include, e.g., ejecting the mixture of electrochemical graphene and the electrode material from a nozzle under high-speed centrifugal action. Filter drying can include, e.g., suction filtering the mixture of electrochemical graphene and the electrode material into blocks and then drying and granulating the filtered mixture.

The granules resulting from the drying and granulation of the mixture of electrochemical graphene and the electrode material can be further mixed with additives such as bonding agents, conductive additives, and/or solvents (e.g., in a ratio of about 8:1:1) to form a slurry (64). The solid content of the slurry can be, e.g., about 40% to about 50%. The slurry can be coated onto a copper or aluminum foil current collector and pressed to form an electrode that can be used in a button cell device for electrochemical testing (66). Other devices, such as A, AA, or AAA batteries, car batteries, and other types of batteries, can also have one or more electrodes including electrochemical graphene.

Referring to FIG. 7, in one example approach to preparing an electrode via spray drying, electrochemical graphene is homogeneously mixed with an electrode material or its precursor in a homogenizer 70 to form a homogeneous solution 71. The homogeneous solution 71 is pumped by a peristaltic pump 72 into a high-speed rotary spray disc and nozzle 74 through a pipeline 76 and ejected under high-speed centrifugal action. The temperature of the nozzle 74 can be set depending on the solvent(s) in the homogenous mixture. In some examples, the temperature of the nozzle 74 is between about 100° C. and about 200° C. The ejected material is dried with a heater 78 to form a powder, which is collected by a powder collection chamber 79. The powder is subjected to an accelerated granulation process at a high inlet temperature to form an electrode. Spray drying is well suited to mass production of electrode materials.

In one example, an electrode was formed of lithium iron phosphate ($LiFePO_4$) particles coated with a layer of amorphous carbon and loaded with (e.g., wrapped with) few-layer flakes of electrochemical graphene (referred to herein as a lithium iron phosphate-electrochemical graphene electrode). A 250 ppm solution of electrochemical graphene flakes in dimethylformamide was added dropwise to a lithium iron phosphate powder including ~300 nm diameter particles coated with an amorphous carbon layer (available from, e.g., Tatung Fine Chemicals Co., Taipei, Taiwan). The solution was stirred at 180° C. to spread the electrochemical graphene flakes through the mixture and to cause the solvent to evaporate.

After evaporation of the solvent, van der Waals forces between the electrochemical graphene and the amorphous carbon-coated lithium iron phosphate particles cause the graphene flakes to wrap around the particles. This wrapping helps to protect the lithium iron phosphate particles against aggregation and volume expansion.

Figures 8A, 8B:
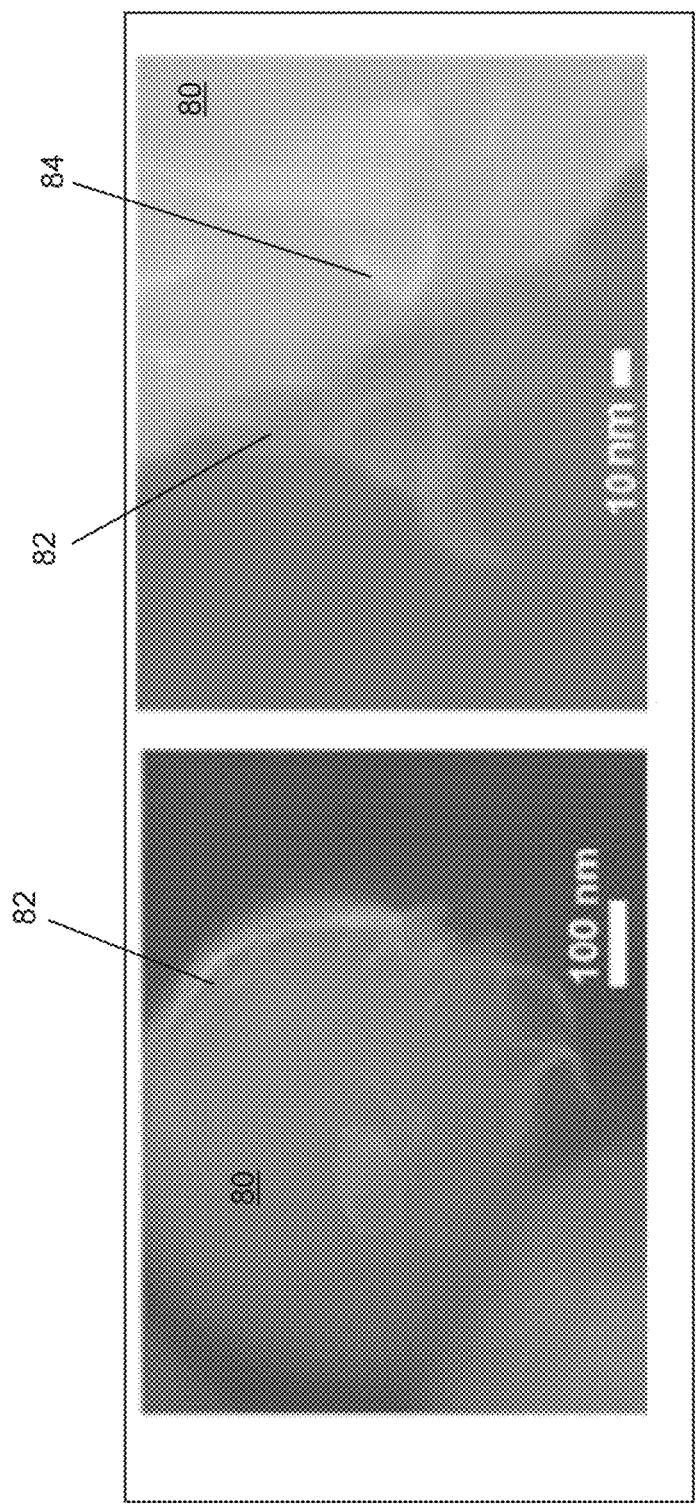
FIGS. 8A and 8B are scanning electron microscopy images of a particle of lithium iron phosphate-electrochemical graphene.

Referring to FIGS. 8A and 8B, scanning electron microscope images reveal that flakes 80 of electrochemical graphene substantially coat the surface of amorphous carbon-coated lithium iron phosphate particles 82. Wrinkles 84 in the electrochemical graphene flakes 80 can also be observed.

Figure 9A:
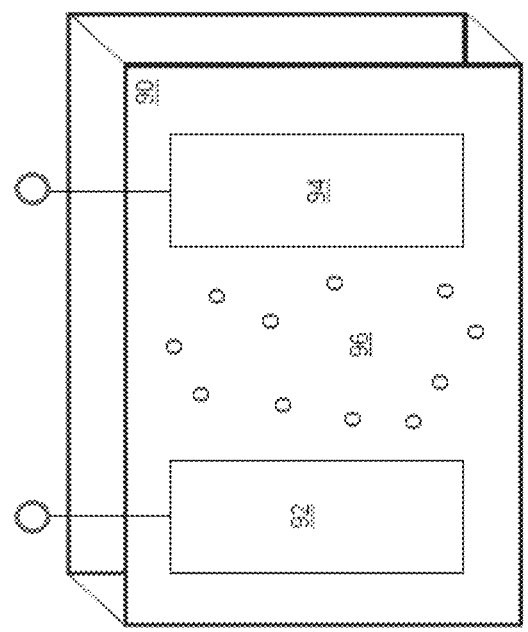
FIG. 9A is a diagram of an example electrochemical cell.

Referring to FIG. 9A, an example electrochemical cell 90 has an electrode loaded with electrochemical graphene. The electrochemical cell 90 can be used to test the electrochemical behavior of various electrode compositions. The electrochemical cell 90 includes a first electrode 92, e.g., formed of lithium iron phosphate-electrochemical graphene. The first electrode 92 including electrochemical graphene can be an anode or a cathode. The electrochemical cell 90 also includes a second electrode 94, e.g., formed of a lithium foil. The electrodes 92, 94 are immersed in an electrolyte solution 96 having ions 98, such as $Li^+$ ions.

Referring to FIGS. 9B-9D, an electrode loaded with electrochemical graphene can be used as the anode and/or cathode in a coin cell battery 91, a cylindrical battery 93, or a prismatic pouch cell battery 95, respectively.

In one example, 10 wt % Super P® carbon black was mixed with 10 wt % polyvinylidene fluoride in N-methyl-2-pyrrolidone followed by the addition of 80 wt % of the active material, such as lithium iron phosphate-electrochemical graphene. The mixture was ball milled with stainless steel balls at 400 rpm. The resultant slurry was pasted onto an aluminum foil current collector and dried at 110° C. for four hours. Electrochemical cells, such as coin or button cells, were then assembled in an argon-filled glove box. The dried slurry containing lithium iron phosphate-electrochemical graphene was used as the first electrode 92 (e.g. an anode or a cathode), lithium foil was used as the second electrode 94 (e.g., a cathode or an anode), and a Celgard® 2600 separator or Celgard® Polypropylene/polyethylene/polypropylene (PP/PE/PP) Trilayer separator (available from, e.g., Celgard, Charlotte, N.C.) was used as a separator. The electrolyte solution included 1 M lithium hexafluorophosphate dissolved in a 1:1 by volume mixture of ethyl methyl carbonate, dimethyl carbonate, and vinylene carbonate. In some examples, the electrolyte solution included 1 M lithium hexafluorophosphate dissolved in a 1 mixture of ethylene carbonate, ethyl methyl carbonate, and dimethyl carbonate (1:1:1 wt %) with 1% vinylene carbonate.

As controls, cathodes and anodes without electrochemical graphene were also fabricated and included in electrochemical cells. For example, an anode composite material was formed of 80 wt % amorphous carbon-coated lithium iron phosphate, 10 wt % bonding agent, and 10 wt % conductive additive. These components were homogeneously mixed in N-methyl-2-pyrrolidone to obtain a slurry having a solid content of about 40% to 50%. The composite slurry was coated onto an aluminum foil current collector and pressed to form an electrode that can be used in a lithium ion battery button cell. A similar preparation can be used to prepare a cathode composite material without electrochemical graphene.

Lithium Iron Phosphate-Electrochemical Graphene Cathodes

In the following, electrochemical cells having lithium iron phosphate-electrochemical graphene cathodes were characterized as a function of the quantity of electrochemical graphene in the cathode. Lithium ion batteries having lithium iron phosphate-electrochemical graphene cathodes exhibit good charging and discharging performance, high electric capacity, and good cycle life. For example, a specific capacity as high as about 210 mAh/g and an energy density as high as 660 Wh/kg can be achieved. This specific capacity is higher than the theoretical maximum specific capacity of about 170 mAh/g predicted for a similar cathode without electrochemical graphene and the typical specific capacity of about 120-160 mAh/g observed for a similar cathode without electrochemical graphene. In addition, the energy density is higher than the typical energy density of about 500 Wh/kg for a similar cathode without electrochemical graphene. These high values for specific capacity and energy density indicate that the presence of electrochemical graphene enhances the electrochemical performance capability of the cathode composite material.

Figure 10A:
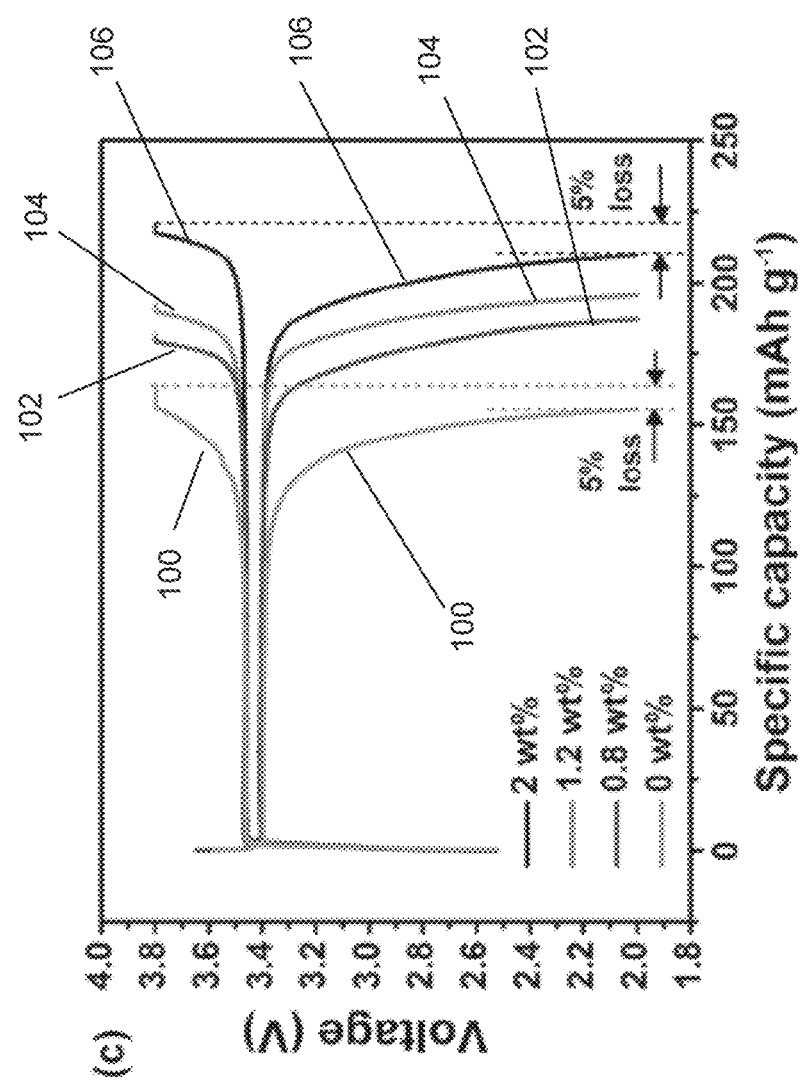
FIGS. 10A and 10B are plots of charging and discharging characteristics of electrochemical cells having lithium iron phosphate-electrochemical graphene cathodes.

Referring to FIG. 10A, charging and discharging voltage profiles of the first charging cycle were measured at a 0.1 C loading rate for electrochemical cells having lithium iron phosphate-electrochemical graphene cathodes loaded with 0.8 wt % (curve 102), 1.2 wt % (curve 104), and 2 wt % (curve 106) electrochemical graphene. A control electrochemical cell having a lithium iron phosphate cathode with no electrochemical graphene (curve 100) was also tested. As the amount of electrochemical graphene in the cathode increases, the specific capacity of the electrochemical cell also increases. For example, the specific capacity of an electrochemical cell having a cathode loaded with 0.8 wt % electrochemical graphene is 187 mAh/g, and the specific capacity of an electrochemical cell having a cathode having 2 wt % electrochemical graphene is 210 mAh/g. The theoretical specific capacity of amorphous carbon-coated lithium iron phosphate particles is 170 mAh/g. The electrochemical cells were tested at ambient temperature in constant current mode with a testing voltage ranging from about 2.0 V to about 3.8 V and were charged in constant voltage mode at 3.8 V until the current reached 0.05 C.

Figure 10B:
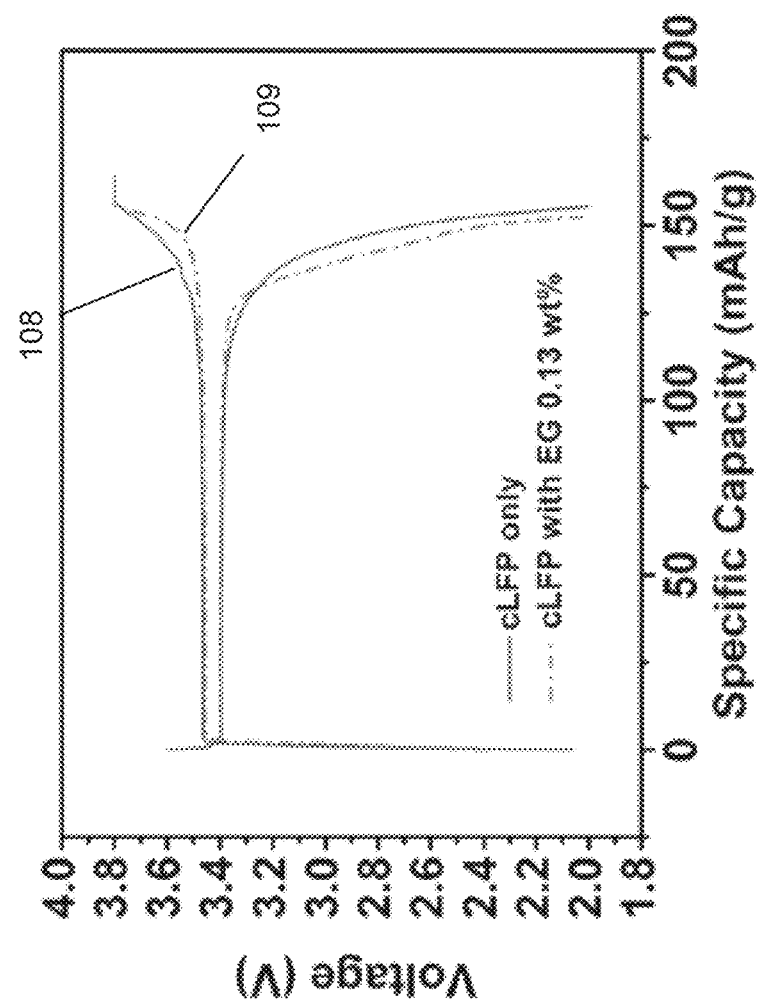

Referring to FIG. 10B, charging and discharging voltage profiles were also measured under the same conditions for an electrochemical cell having a lithium iron phosphate-electrochemical graphene cathodes loaded with 0.13 wt % (curve 109) electrochemical graphene. For comparison, a control electrochemical cell having a lithium iron phosphate cathode with no electrochemical graphene (curve 108) was also tested. These two profiles do not differ significantly from each other, suggesting that the improvements in specific capacity with increasing electrochemical graphene content (e.g., as shown in FIG. 10A) may be triggered by a minimum threshold quantity of electrochemical graphene present in the cathode material. That is, cathodes having less than the minimum threshold quantity of electrochemical graphene may not exhibit improved performance.

Without being bound by theory, the improvement in specific capacity of an electrochemical cell having few-layer flakes of electrochemical graphene incorporated into the cathode can be explained by the availability of additional $Li^+$ ion storage sites in electrochemical graphene. The major capacity of an electrochemical cell can be attributed to the extraction of lithium ions from lithium iron phosphate particles (during charging) and the insertion of lithium ions into lithium iron phosphate particles (during discharging). This process can be represented by the chemical equation $LiFePO_4=FePO_4+Li^++e^-$.

The extraction of lithium ions from the ordered-olivine structure of lithium iron phosphate particles can be limited by one or both of the following limiting processes. A first limiting process may be limited phase boundary diffusion. The diffusion of lithium ions through lithium iron phosphate can be impeded by structural characteristics such as ionic disorder, foreign phases, stacking faults, and/or other structural characteristics. The interruption of lithium ion diffusion can impede the motion of a phase boundary between a lithium iron phosphate ($LiFePO_4$) phase and an iron phosphate ($FePO_4$) phase, thus potentially preventing portions of the anode or cathode material from participating in lithium extraction and insertion. This reduction in available volume for lithium ion intercalation can cause a loss of capacity. A second limiting process may be low electron conductivity in lithium iron phosphate. A low electron mobility prevents electrons from transferring rapidly, thus limiting the rate of lithium extraction and insertion and causing a loss of capacity.

Figure 11:
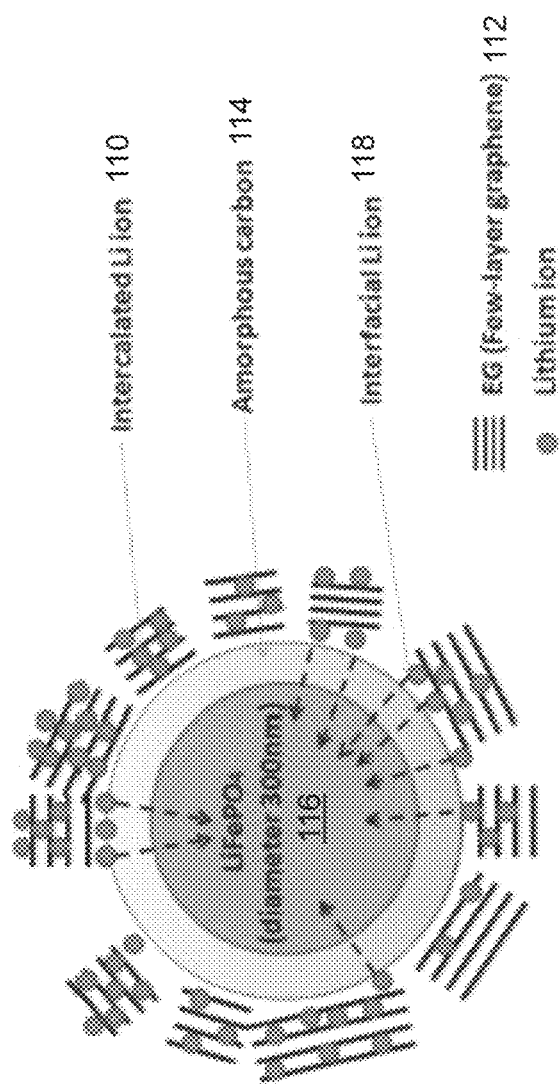
FIG. 11 is a diagram of a particle of lithium iron phosphate-electrochemical graphene.

Without being bound by theory, the enhanced capacity of an electrochemical cell having an anode or cathode including electrochemical graphene can be attributed to the existence of an additional storage mechanism for lithium ions provided by the few-layer flakes of electrochemical graphene. Potential storage mechanisms for lithium ions are shown in FIG. 11. For example, lithium ions 110 can intercalate into few-layer flakes 112 of electrochemical graphene on the surface of an amorphous carbon 114-coated lithium iron phosphate particle 116, e.g., between the layers of the graphene flakes. Lithium ions 118 can also adsorb onto the carbon 114 surface of the lithium iron phosphate particle. In addition, a reversible reduction-oxidation reaction between Li and electrochemically exfoliated graphene can contribute to the enhanced capacity.

Transmission electron microscopy imaging of lithium iron phosphate-electrochemical graphene materials after charging (i.e., after lithium ion extraction) and after discharging (i.e., after lithium ion insertion) reveal these storage mechanisms. Transmission electron microscopy imaging was performed on materials obtained by cleaving the test electrochemical cell immediately after charging or after discharging. The cathode was rinsed in ethanol and dried in a glove box. The dried cathode material was scratched off from the aluminum foil, sonicated in ethanol, and dropped onto a copper grid for transmission electron microscopy imaging.

FIG. 12A shows a high resolution transmission electron microscopy image of a particle 120 of lithium iron phosphate-electrochemical graphene with 0.8 wt % electrochemical graphene after charging (i.e., after $Li^+$ extraction from the cathode). An amorphous carbon coating 122 of about 1 nm thickness coats the lithium iron phosphate particle 120. Few-layer flakes of electrochemical graphene 124 of about 1.5-2 nm thickness is present above the amorphous carbon coating 122. The layers of the graphene flakes 124 are generally well ordered and stacked around the surface of the lithium iron phosphate particle 120.

FIG. 12B shows a high resolution transmission electron microscopy image of a particle 125 of lithium iron phosphate-electrochemical graphene with 0.8 wt % electrochemical graphene after discharging (i.e., after $Li^+$ insertion into the cathode). FIG. 12C shows a magnified high resolution transmission electron microscopy image of the lithium iron phosphate particle 125 after discharging. Few-layer flakes of electrochemical graphene 126 are present but disordered, with many layers oriented randomly with respect to the surface of the lithium iron phosphate particle 125.

The layer-to-layer spacing in the graphene flakes 126 changes upon charging and discharging of the cathode particle 125. In one example, the layer-to-layer distance in the graphene flakes 126 is 0.372 nm in the discharged cathode particle 125. In contrast, the layer-to-layer distance in the graphene flakes 124 in the charged cathode particle 120 is only 0.34 nm. In another example, the layer-to-layer distance is 0.38 nm in the discharged cathode particle 125 and 0.31 nm in the charged cathode particle 120. These layer-to-layer values were determined by averaging layer-to-layer distances for multiple sites (e.g., at least 12 sites, or at least 20 sites) in the transmission electron microscopy images. For structurally perfect crystalline graphite intercalated with $Li^+$, the expected layer-to-layer distance is 0.37 nm.

The difference in the structure of the charged and discharged graphene flakes may indicate that $Li^+$ ions intercalate into the electrochemical graphene flakes upon discharging of the cathode, expanding the d-spacing of the electrochemical graphene flakes. In particular, the well-defined interplanar (e.g., interlayer) spacing in electrochemical graphene may provide a scaffold that is well suited to the hosting of a lattice of intercalated $Li^+$ ions.

Figure 13:
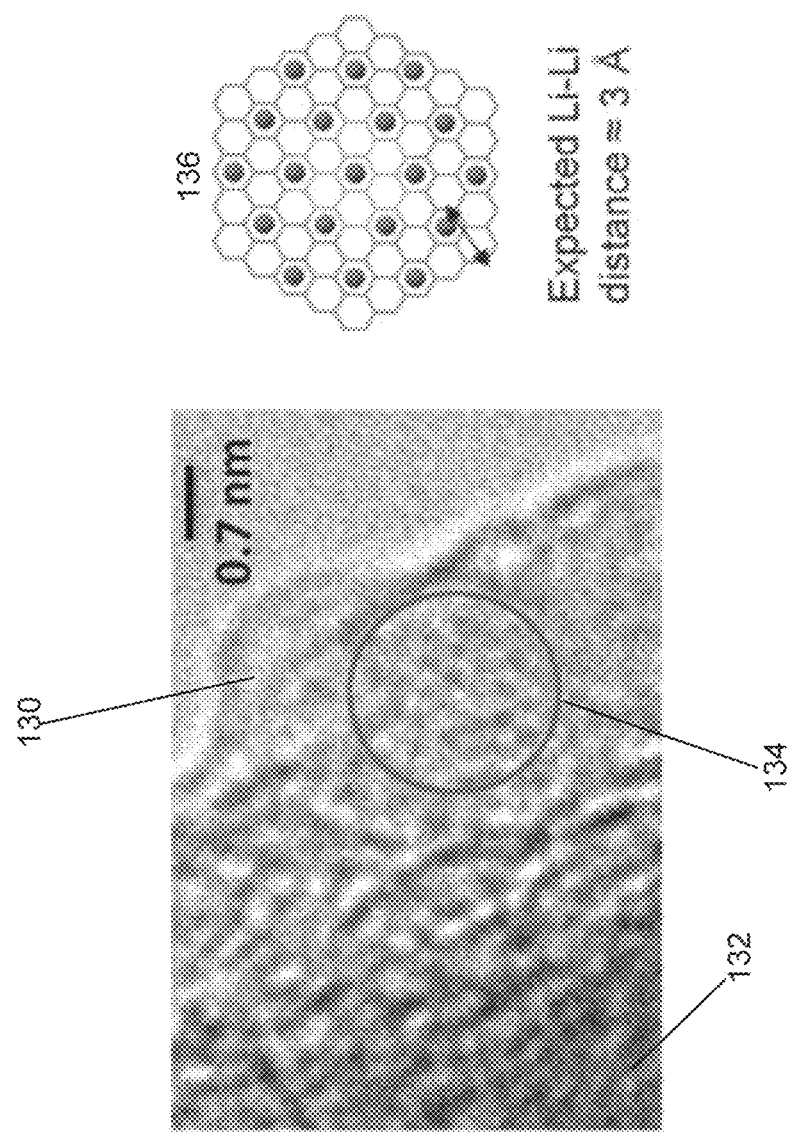
FIG. 13 is a transmission electron microscopy image of a lithium iron phosphate-electrochemical graphene material.

Referring to FIG. 13, a high-resolution transmission electron microscopy image shows an in-plane view of electrochemical graphene flakes 130 at the edge of a discharged cathode particle 132. A hexagonal structure 134 present in the graphene flakes 130 indicates the presence of a hexagonal lattice of $Li^+$ ions intercalated into the crystal structure of the graphene flakes 130. A schematic representation 136 shows a possible crystal structure resulting from $Li^+$ ion intercalation into graphene. The presence of these intercalated $Li^+$ ions may contribute to the enhanced capacity of the cathode.

Figure 14:
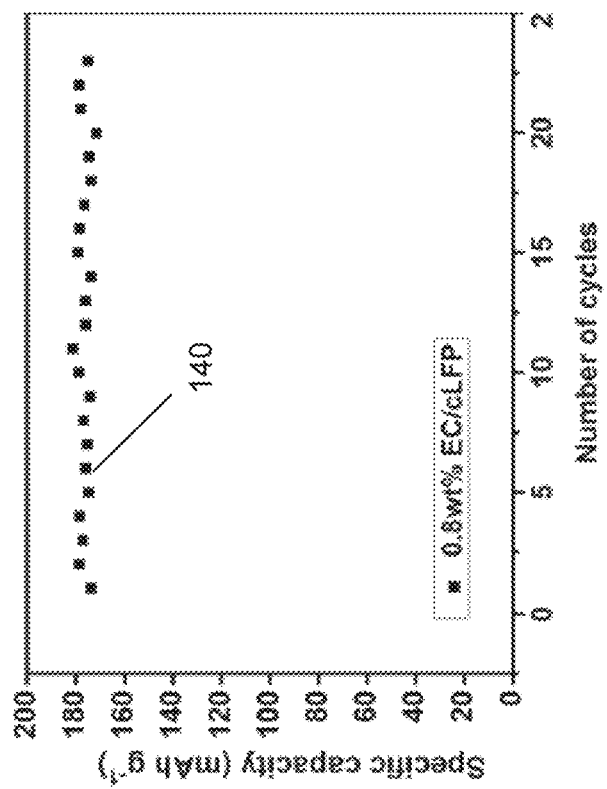
FIG. 14 is a plot of the life cycle versus capacity of an electrochemical cell having a lithium iron phosphate-electrochemical graphene cathode over.

The adsorption of $Li^+$ ions on the surface of electrochemical graphene may also contribute to the enhanced capacity of the cathode. In general, surface adsorption of $Li^+$ ions causes instability in the life cycle of an electrochemical cell. Referring to FIG. 14, the life cycle (curve 140) of an electrochemical cell having a lithium iron phosphate-electrochemical graphene cathode loaded with 0.8 wt % electrochemical graphene is stable, indicating that surface adsorption of $Li^+$ ions may not be the dominant mechanism driving the excess capacity of such an electrochemical cell.

The presence of electrochemical graphene in a lithium iron phosphate cathode reduces the irreversible first cycle loss of capacity of the electrochemical cell. Referring again to FIG. 10A, the irreversible loss of capacity of the electrochemical cell is substantially zero for cathodes loaded with 0.8 wt % (curve 102) and 1.2 wt % (curve 104) electrochemical graphene. Without being bound by theory, this performance can be attributed to the highly conductive coating of few-layer graphene wrapping substantially homogeneously around the amorphous carbon-coated lithium iron phosphate particles. The homogeneous graphene coating serves as a fast path for electron migration during charging and discharging. In general, electron transfer is more efficient in $sp^2$ bonding (i.e., the type of bonding present in graphene) than in $sp^3$ bonding (i.e., the type of bonding present in amorphous carbon). Efficient electron transfer through the electrochemical graphene coating enables electrons to spread over the entire surface of the lithium iron phosphate particles during cycles of charging and discharging, thus improving the kinetics and reversibility of lithium insertion and extraction.

The irreversible capacity increases to 5% for a cathode with 2 wt % electrochemical graphene (curve 106), which is comparable to the irreversible capacity of an electrochemical cell including an amorphous carbon-coated lithium iron phosphate cathode without electrochemical graphene. In general, the first cycle loss percentage increases with the carbon content of the lithium iron phosphate cathode because of the corresponding increase in the Li+ diffusion path through the layer of amorphous carbon.

Figure 15:
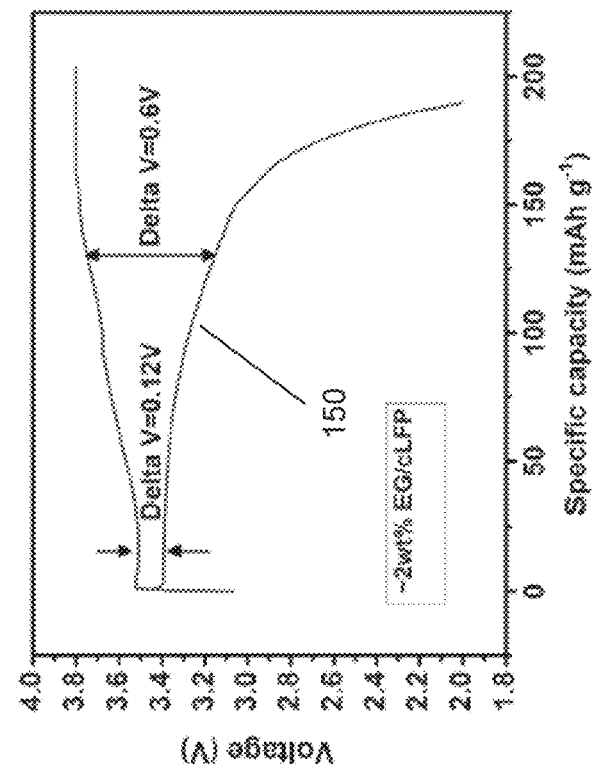
FIG. 15 is a plot of charging and discharging characteristics of an electrochemical cell including an amorphous carbon-coated lithium iron phosphate cathode loaded with stacks of graphene.

For the cathode with 2 wt % electrochemical graphene (curve 106), the voltage plateau remains at 3.4 V, indicating that the homogenous coating of electrochemical graphene likely does not cause an undesirable polarization effect. Hypothetically, if the coating of electrochemical graphene around the lithium iron phosphate particles was not uniform (e.g., if the few-layer flakes of electrochemical graphene were to stack together), the stacked flakes would behave like graphite particles rather than few-layer graphene flakes, which would result in additional voltage polarization. Additional voltage polarization may also occur at higher weight percentages of electrochemical graphene. As a control experiment, lithium iron phosphate particles loaded with 2 wt % electrochemical graphene were prepared with rough mixing rather than by adding the solution of electrochemical graphene in a dropwise manner. This preparation causes the graphene layers to stack together, forming thicker aggregates held together via a π-π it stacking interaction. Referring to FIG. 15, the voltage profile (curve 150) for a test cell having a cathode formed in this manner exhibits clear voltage polarization. This control experiment demonstrates that the few-layer nature of the independent electrochemical graphene flakes contributes to the observed low polarization and the low first cycle percentage loss.

Figure 16:
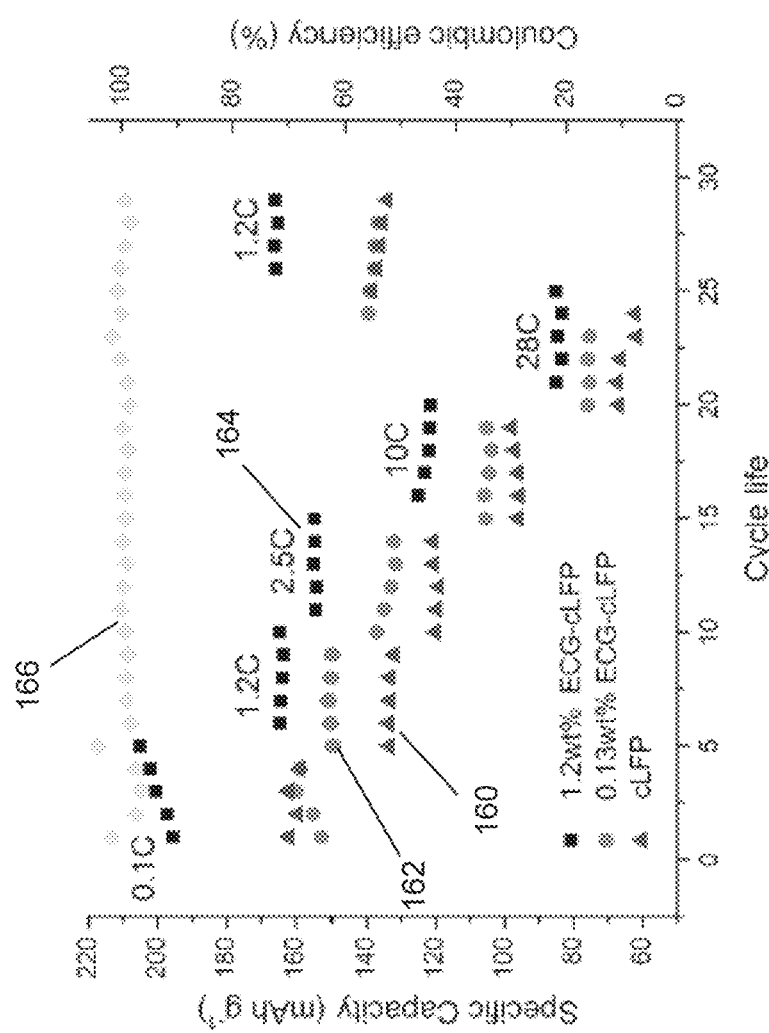
FIG. 16 is a plot of discharge rate capability and Coulombic efficiency for electrochemical cells having lithium iron phosphate-electrochemical graphene cathodes.

FIG. 16 shows the discharge rate capability (i.e., specific capacity) for electrochemical cells including lithium iron phosphate-electrochemical graphene cathodes loaded with 0.13 wt % (data points 162), and 1.2 wt % (data points 164) electrochemical graphene. For comparison, a control electrochemical cell having a lithium iron phosphate cathode with no electrochemical graphene (data points 160) was also tested. The specific capacity was tested for various charge/discharge rates. In general, as the discharge rate increases, none of the tested cathode compositions can sustain a high discharge current (e.g., fast $Li^+$ intercalation), and the specific capacity decreases. The cathodes loaded with electrochemical graphene consistently exhibit a higher specific capacity than the cathode without electrochemical graphene, delivering at least about 23% higher capacity at low discharge rates (e.g., 0.1 C-1.3 C) and at least about 26% higher capacity at high discharge rates (e.g., 2.5 C-28 C). For example, the electrochemical cell loaded with 1.2 wt % electrochemical graphene can deliver a capacity of 125 mAh/g at a 10 C discharge rate, which is about 26% better than the capacity of 98 mAh/g obtained from the electrochemical cell without electrochemical graphene.

The Coulombic efficiency at various charge/discharge rates is also shown for the 1.2 wt % cathode (data points 166). The Coulombic efficiency remains steady at about 98-100% for all measured C rates, indicating that the amount of $Li^+$ inserted into and extracted from the lithium iron phosphate-electrochemical graphene cathode remains substantially constant, with little to no loss during charging and discharging.

Figure 17:
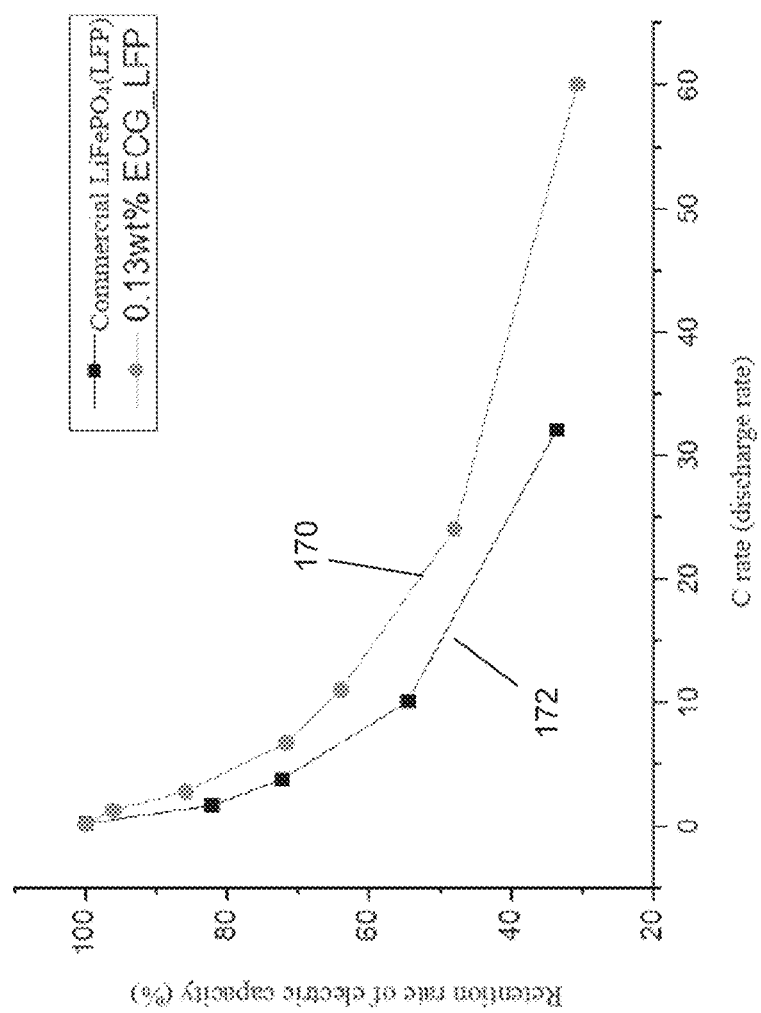
FIG. 17 is a plot of the retention rate of electric capacity versus the discharge rate for electrochemical cells having lithium iron phosphate-electrochemical graphene anodes.

The impact of the presence of electrochemical graphene on the electric capacity of lithium iron phosphate-electrochemical graphene cathodes at different charge/discharge rates can be quantified by calculating the total discharge time under constant discharge current and converting the total discharge time into the actual discharge rate. Referring to FIG. 17, batteries having cathodes loaded with electrochemical graphene (curve 170) can reach a higher retention rate under fast discharging conditions than batteries having cathodes without electrochemical graphene (curve 172). This result indicates that the presence of electrochemical graphene may contribute to an increase in the energy density of battery materials under high current and thus to an increase in the power output of the batteries. Such an increase can be useful, e.g., to increase the maximum tolerable current during acceleration of an electric car and while going up an incline without changing the voltage of the battery pack of the electric car.

Figure 18:
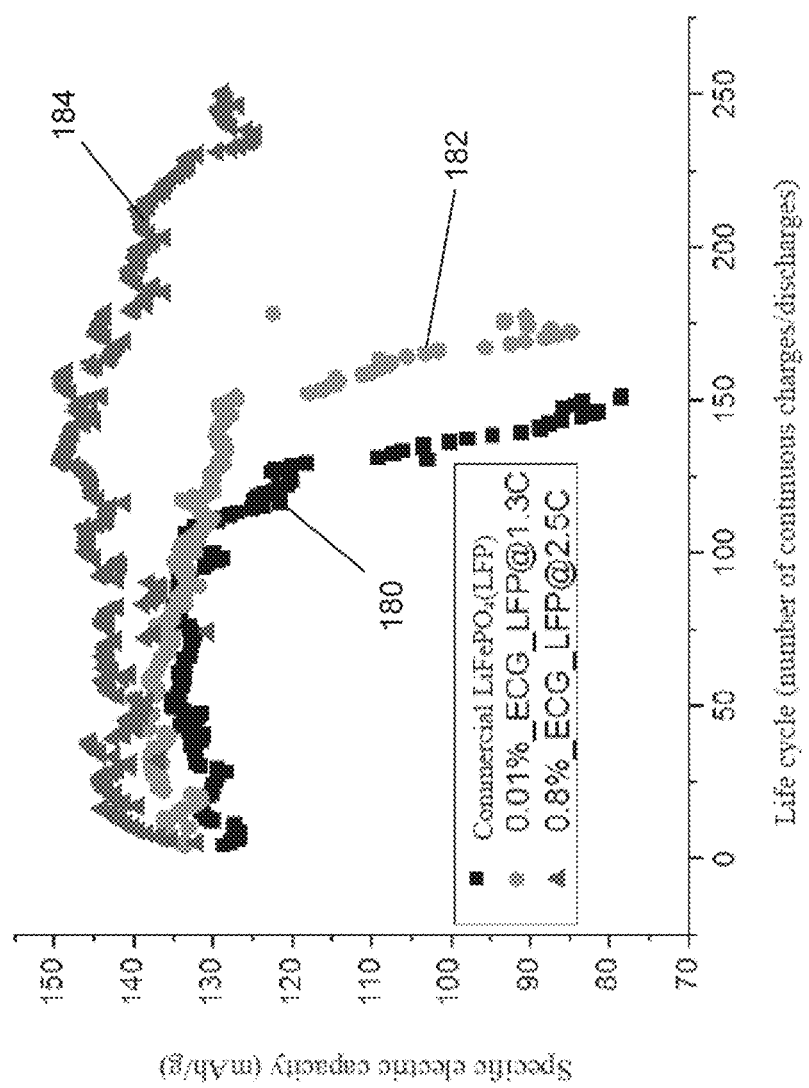
FIG. 18 is a plot of the life cycle versus capacity of electrochemical cells having lithium iron phosphate-electrochemical graphene anodes.

The cost of lithium ion batteries for electric cars is high. By extending the battery life, the cost can be reduced. FIG. 18 shows the specific capacity under constant discharge current for electrochemical cells having lithium iron phosphate-electrochemical graphene cathodes loaded with 0.01 wt % (curve 182) and 0.8 wt % (curve 184) electrochemical graphene. For comparison, a control electrochemical cell having a lithium iron phosphate anode with no electrochemical graphene (curve 180) was also tested. Testing was performed by activating the test cells for three cycles at 0.1 C and then charging/discharging the test cells at 1.3 C continuously under harsh test conditions. The life cycle of electrochemical cells having lithium iron phosphate-electrochemical graphene cathodes is significantly increased over the life cycle of electrochemical cells having cathodes without electrochemical graphene.

To investigate the origin of the excess capacity in lithium iron phosphate-electrochemical graphene cathodes, test cathode materials were formed by depositing 1.8 wt % electrochemical graphene onto inactive silica particles (diameter ~5-10 µm), in some cases adding a conductive additive and a bonding agent. Control cathode materials were also formed of silica particles without electrochemical graphene. Silica does not significantly contribute to cathode capacity. Coin sized cells of the silica-based cathode materials were prepared and tested. Measuring the capacity of the silica cathode materials with and without electrochemical graphene can provide a direct measurement of the capacity of electrochemical graphene flakes.

Figure 19:
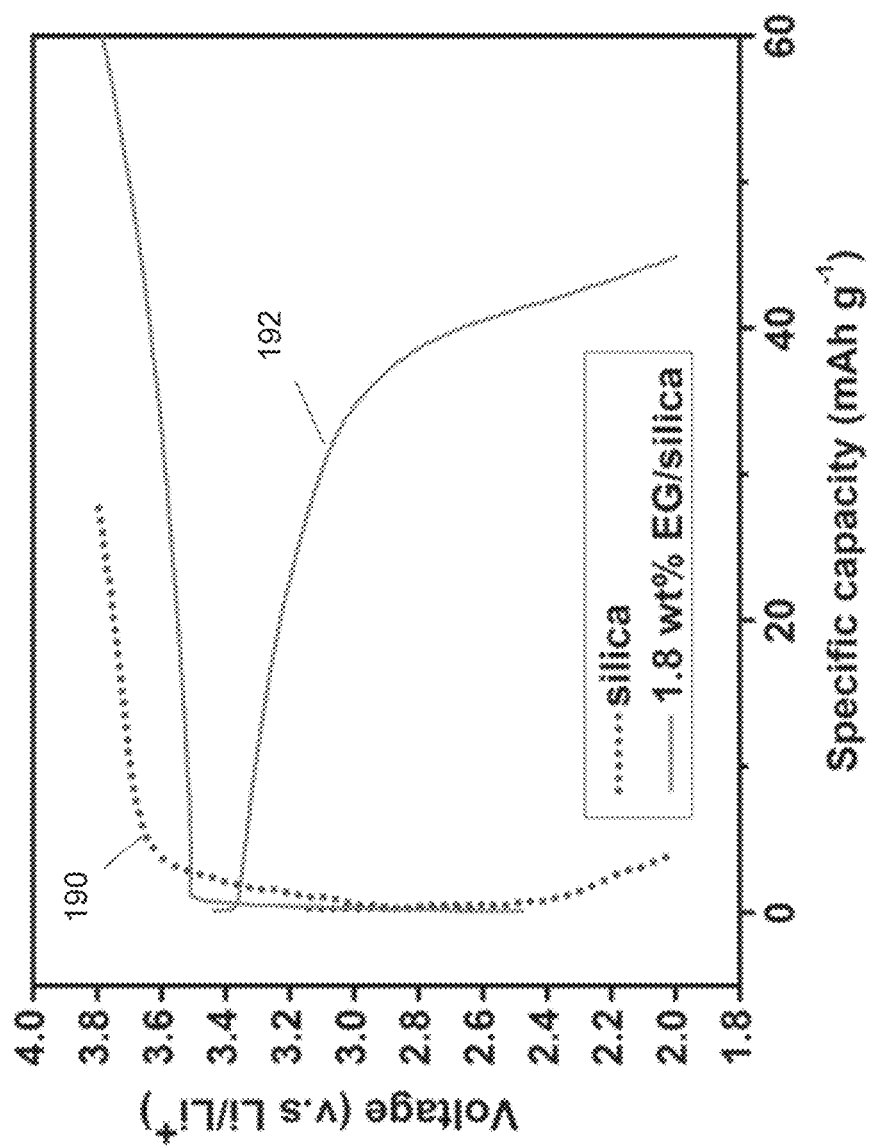
FIG. 19 is a plot of second cycle voltage profiles of cathodes.

Referring to FIG. 19, second cycle voltage profiles of cathodes formed of silica particles and of silica particles loaded with 1.8 wt % electrochemical graphene are shown as curves 190, 192, respectively. Silica particles exhibit a small reversible capacity (curve 190), whereas electrochemical graphene flakes demonstrate a significantly large reversible capacity (curve 192).

Figure 20:
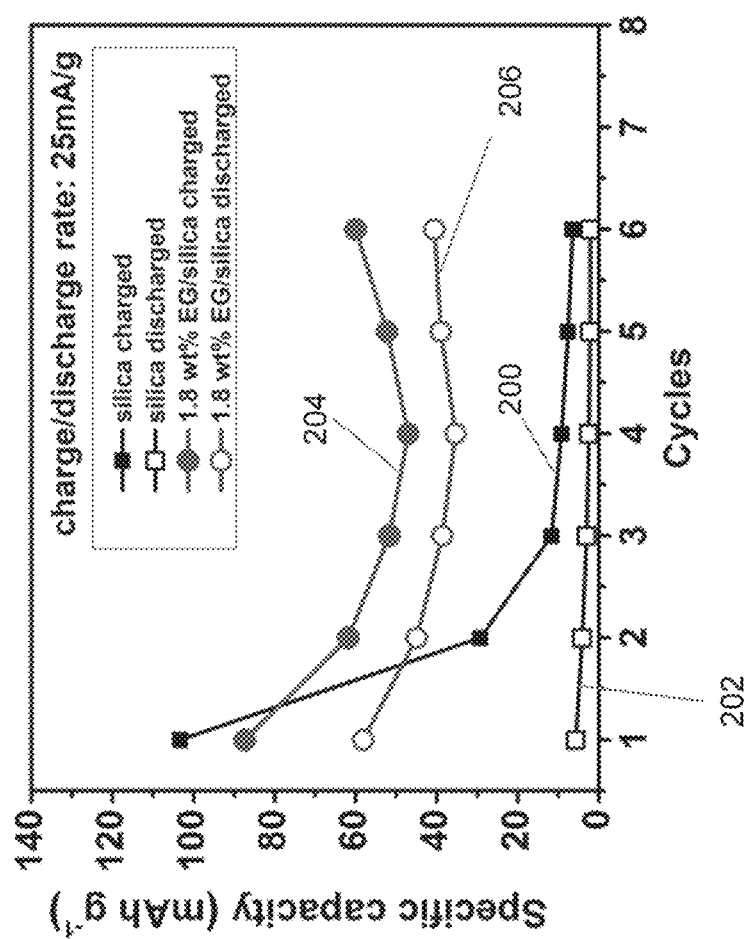
FIG. 20 is a graph showing the relationship between specific capacity and charging cycles for various cathodes.

Referring to FIG. 20, the cycling properties of silica particles and of silica particles loaded with 1.8 wt % electrochemical graphene are measured at a fixed charge/discharge current density of 25 mA/g, corresponding to 0.5 C and 7.5 C of rate capabilities for the cathodes with 1.8 wt % and 0 wt % electrochemical graphene respectively. Curves 200 and 202 show the specific capacity for charged and discharged silica particles, respectively; curves 204 and 206 show the specific capacity for charged and discharged silica particles loaded with 1.8 wt % electrochemical graphene, respectively. The rate capability of silica particles loaded with 1.8 wt % electrochemical graphene remains after six cycles. The rate capability of silica particles without electrochemical graphene fades after a few cycles. The charge (discharge) capacity for silica particles loaded with 1.8 wt % electrochemical graphene at the 6th cycle is 53.5 (38.3) mAh g$^{-1}$ higher than the capacity for pure silica, where the specific charge (discharge) capacity of electrochemical graphene is estimated to be about 2970 (2120) mAh g$^{-1}$. Since the preparation of electrochemical graphene involves electrochemical reactions in a solution, some redox active sites or defects may be activated and remain on electrochemical graphene. These results suggest that electrochemical graphene flakes incorporated into a cathode material can enhance the Li$^+$ ion storage capability, and that the Li+ ion storage mechanism is reversible.

Figure 21:
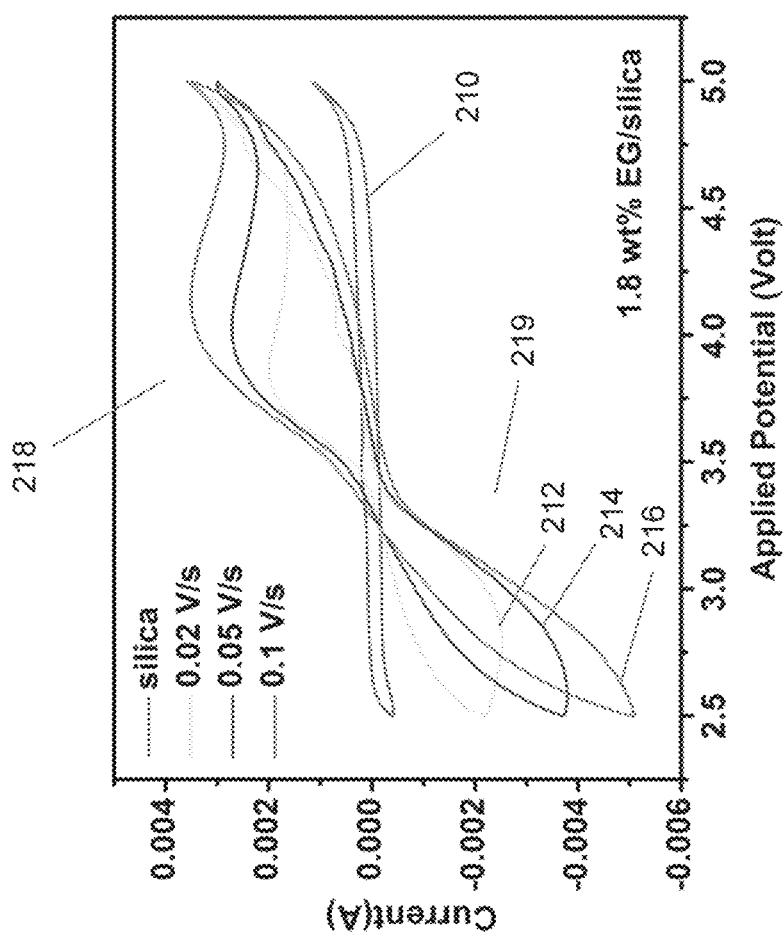
FIG. 21 is a cyclic voltammetry plot of silica particles loaded with electrochemical graphene.

FIG. 21 shows cyclic voltammetry plots for silica particles (curve 210), measured at 0.05V/s; and for silica particles loaded with 1.8 wt % electrochemical graphene, measured at 0.02 V/s (curve 212), 0.05 V/s (curve 214), and 0.1 V/s (curve 216). Oxidation peaks 218 at about 3.5-4 V and reduction peaks 219 at about 2.5-3.5 V demonstrate that a redox reaction occurs, which can contribute to the Li$^+$ ion storage capacity. The redox peak is broad, suggesting that the ability of electrochemical graphene to improve the capacity of an electrode is not limited to lithium iron phosphate but can also be applied to other materials, such as other oxides.

Other Materials

Other materials can also be added to cathode materials to enhance the cathode performance and capacity. Referring to FIG. 22A, in general, layered composite cathode particles 220 can be created that include cathode materials 222, one or more storage materials 224, such as layer-structured materials, high lithium storage capacity materials, and/or organic materials, and/or one or more functional materials 226. Such composite cathode particles 220 can exhibit enhanced electrochemical performance, such as high rate capability and improved cycle life, while exhibiting voltage profiles that remain similar to cathode materials. The capacity of the composite cathode particles 220 can be tuned by superposition of the constituent materials on the cathode particle. For instance, the cathode capacity can be increased through the parallel capacitance of one or more layers of constituent materials.

Figure 22B:
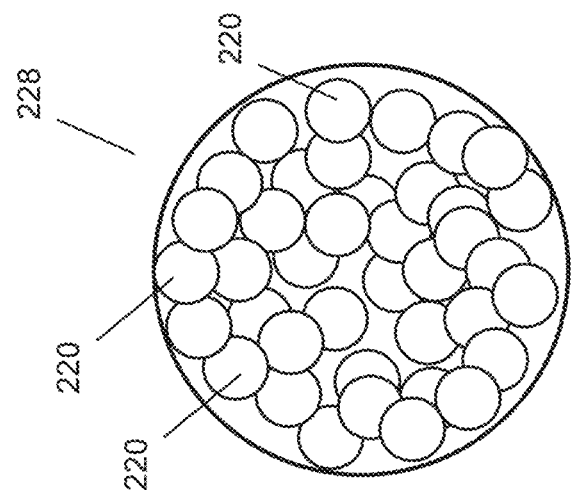
FIG. 22B is a diagram of a cathode formed of the composite cathode material of FIG. 22A.
Figure 22A:
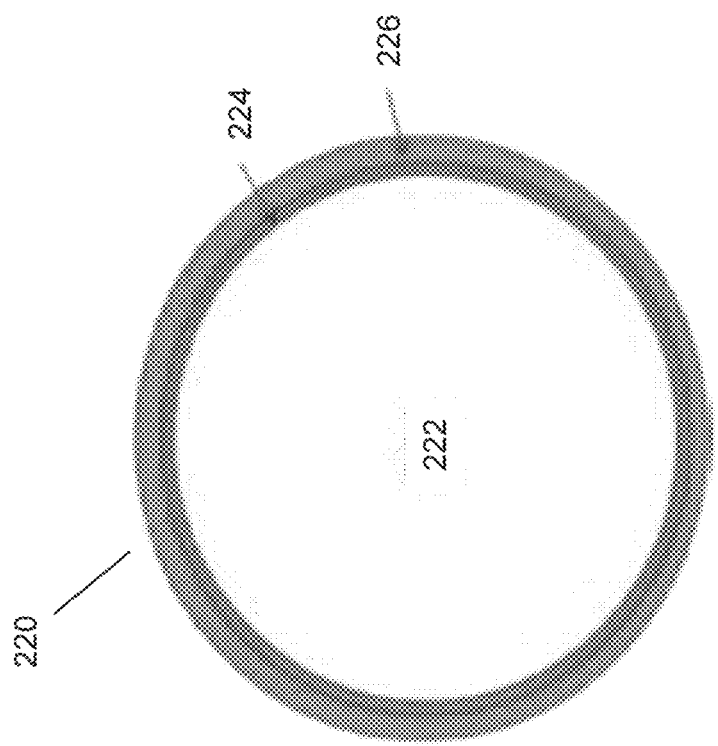
FIG. 22A is a diagram of a composite cathode material.

Referring to FIG. 22B, a cathode 228 can be formed of the composite cathode particles 220. The cathode 228 can be used as a cathode for an electrochemical cell or battery, such as the coin cell battery 91, the cylindrical battery 93, or the pouch cell battery 95, as shown in FIGS. 9B-9D, respectively, or another type of battery.

Example cathode materials 222 for use in lithium ion batteries may include, e.g., one or more of a lithium-based material (e.g., LiFe$_{(1-x)}$M$_x$P$_{(1-x)}$O$_{2(2-x)}$, 0≤x≤1) such as lithium iron oxide, lithium iron phosphate, lithium iron phosphorous oxide, lithium cobalt oxide (LiCoO$_2$), lithium manganese oxide (LiMn$_2$O$_4$), lithium nickel oxide (LiNiO$_2$), lithium cobalt manganese nickel, lithium cobalt manganese nickel (NCM) oxide, and other cathode materials.

Storage materials 224 may include layer-structured structured materials, high lithium storage capacity materials and/or organic materials. High lithium storage capacity materials may include, e.g., one or more of sulfur, silicon, tin, ceramic materials, lithium sulfide (Li$_2$S), and other high lithium storage capacity materials. Layer-structured materials may include, e.g., transition metal dichalcogenides such as one or more of MoS$_2$, MoSe$_2$, WS$_2$, WSe$_2$, and other transition metal dichalcogenides; and/or corresponding materials with similar stoichiometric ratios, such as MoS$_x$. Organic materials may include, e.g., one or more of triazine, melamine, and thiophene.

Functional materials 226 may include, e.g., one or more of electrochemical graphene, carbon nanotubes, graphene, and conducting carbon materials, and other functional materials.

In one example, a composite cathode material was formed by adding sulfur to amorphous carbon-coated lithium iron phosphate particles. To form the composite cathode material, sulfur powder was heated in a furnace to 150-200° C. to form sulfur vapors. Amorphous carbon-coated lithium iron phosphate particles were placed in a lower temperature region of the furnace such that sulfur vapors were deposited onto the lithium iron phosphate particles, with the aid of a gentle gas flow from high temperature regions to low temperature regions.

Figure 23:
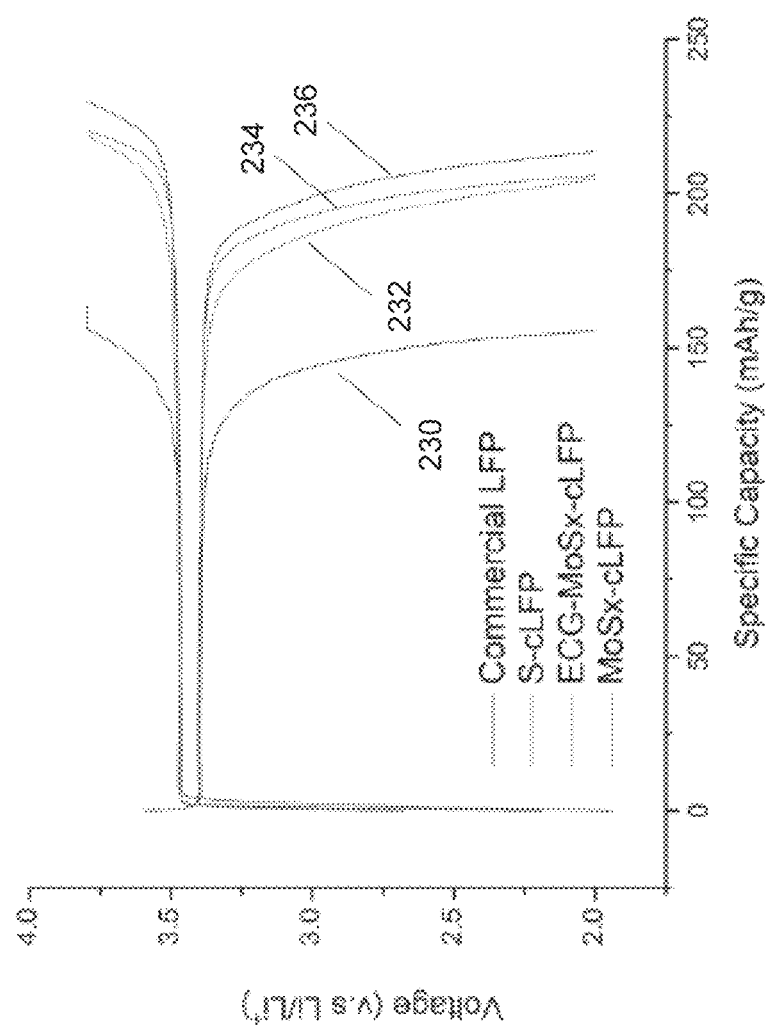
FIG. 23 is a plot of the specific capacity versus voltage of various composite cathode materials.

Referring to FIG. 23, a cathode formed of amorphous carbon-coated lithium iron phosphate particles loaded with sulfur (curve 232) exhibits an enhanced capacity (beyond 200 mAh/g) as compared to a cathode formed of amorphous carbon-coated lithium iron phosphate particles (curve 230).

In one example, a composite cathode material was formed by adding the layered materials MoS$_2$ and/or MoS$_x$ to amorphous carbon-coated lithium iron phosphate particles. To form the composite cathode material, alkyldiammoniumthiomolybdate (a precursor to MoS$_2$) and/or ammonium thiomolybdate (a precursor to MoS$_x$) was dissolved in N-methyl-2-pyrrolidone, and amorphous carbon-coated lithium iron phosphate particles were added to the solution.

The solution was heated to 100-200° C. and refluxed for four hours. The resulting precipitate was collected by filtration and dried at a high temperature (e.g., about 300-1000° C.) under vacuum or nitrogen atmosphere. The structure of the $MoS_2$ and $MoS_x$ deposits became more crystalline during the heat treatment.

Referring again to FIG. 23, a cathode formed of amorphous carbon-coated lithium iron phosphate particles loaded with $MoS_x$ (curve 234) also exhibits an enhanced capacity of beyond 200 mAh/g. Further loading the $MoS_x$-loaded cathode with electrochemical graphene (curve 236) also results in a cathode that exhibited a capacity of beyond 200 mAh/g.

In one example, amorphous carbon-coated lithium iron phosphate particles can be loaded with small sized organic molecules such as triazine, melamine, and/or thiophene. For example, triazine can be thermally evaporated onto amorphous carbon-coated lithium iron phosphate particles. Thiophene is a liquid that can be directly mixed with amorphous carbon-coated lithium iron phosphate particles. The molecules can be dissolved in a solvent such as N-methylpyrrolidone or dimethylformamide and coated onto amorphous carbon-coated lithium iron phosphate particles. Cathodes formed of these materials also exhibit enhanced capacity. The use of these organic molecules as a cathode additive is not limited to the small molecule forms of these molecules. For example, the molecules can be polymerized as polymers, which can be used as the high capacitive cathode additives.

It is to be understood that the foregoing description is intended to illustrate and not to limit the scope of the invention, which is defined by the scope of the appended claims. A number of implementations have been described. Nevertheless, it will be understood that various modifications may be made. For example, the electrode 50 can be used as an anode and/or a cathode for a battery other than a coin cell battery, a cylindrical battery, or a prismatic pouch cell battery. Other types of batteries can also use electrodes that have electrochemical graphene. Other implementations are within the scope of the following claims.

What is claimed is:

1. A battery, comprising:
   a first electrode comprising:
      a plurality of particles containing lithium;
      a layer of carbon at least partially coating a surface of each of at least some of the particles; and
      electrochemically exfoliated graphene at least partially coating one or more of the plurality of particles, in which the electrochemically exfoliated graphene is produced using an electrochemical exfoliation process that includes:
         immersing, in a solution containing an electrolyte, a portion of a third electrode and a portion of a fourth electrode, the immersed portion of the third electrode including a carbon material,
         causing an electric potential to exist between the third and fourth electrodes, the third electrode having a higher electric potential than the fourth electrode, and
         recovering, from the solution, graphene sheets exfoliated from the carbon material of the third electrode;
   a second electrode; and
   an electrolyte, wherein at least a portion of the first electrode and at least a portion of the second electrode contact the electrolyte.

2. The battery of claim 1, wherein the first electrode is a cathode.

3. The battery of claim 1, wherein the first electrode is an anode.

4. The battery of claim 1, wherein the particles include at least one of lithium iron phosphate, lithium iron oxide, lithium iron phosphorous oxide, lithium cobalt oxide, lithium manganese oxide, lithium nickel oxide, lithium cobalt manganese nickel, or lithium cobalt manganese nickel oxide.

5. The battery of claim 1, wherein the electrochemically exfoliated graphene includes a plurality of flakes of electrochemically exfoliated graphene disposed on the carbon.

6. The battery of claim 1, wherein the electrochemically exfoliated graphene forms about 0.001 wt % to about 5 wt % of the electrode.

7. The battery of claim 1 in which the first electrode comprises at least one of a transition metal dichalcogenide, triazine, or thiophene.

8. The battery of claim 7 in which the first electrode comprises at least one of $MoS_x$, $MoSe_2$, $WS_2$, or $WSe_2$.

9. The battery of claim 8 in which the first electrode comprises $MoS_2$.

10. The battery of claim 1, wherein the layer of carbon includes a layer of amorphous carbon.

11. The battery of claim 1, wherein a specific capacity of the electrode material is at least about 180 mAh/g.

12. The battery of claim 11, wherein the specific capacity of the electrode material is about 210 mAh/g.

13. The battery of claim 1, wherein the electrochemically exfoliated graphene includes less than about 20 wt % oxygen.

14. The battery of claim 1, wherein a permeability of the electrochemically exfoliated graphene is less than about 90% and a sheet resistance is less than about 10 kΩ/sq.

15. The battery of claim 1, comprising an additive material including at least one of a conductive additive material, a bonding agent, a carbon material, or a solvent.

16. The battery of claim 15, wherein the additive material includes at least one of graphite, soft carbon, hard carbon, carbon nanotubes, or carbon fibers.

17. The battery of claim 1, comprising at least one of sulfur, silicon, tin, ceramic materials, or lithium sulfide.

18. The battery of claim 1 in which the electrochemical exfoliation process comprises:
   immersing, in a solution containing an electrolyte, a portion of a third electrode and a portion of a fourth electrode, the immersed portion of the third electrode including a first carbon material and the immersed portion of the fourth electrode including a second carbon material or a metal;
   causing a potential to exist between the third and fourth electrodes; and
   recovering, from the solution, graphene sheets exfoliated from the carbon material(s).

19. A method of fabricating a battery, the method comprising:
   producing electrochemically exfoliated graphene using an electrochemical exfoliation process that includes:
      immersing, in a solution containing an electrolyte, a portion of a third electrode and a portion of a fourth electrode, the immersed portion of the third electrode including a carbon material,
      causing an electric potential to exist between the third and fourth electrodes, the third electrode having a higher electric potential than the fourth electrode, and
      recovering, from the solution, graphene sheets exfoliated from the carbon material of the third electrode;

providing a first electrode, including
providing a plurality of particles containing lithium and having a layer of carbon coating at least a portion of a surface of each of at least some of the particles, and
disposing the electrochemically exfoliated graphene among the plurality of particles, wherein the electrochemically exfoliated graphene at least partially coats one or more of the plurality of particles;
providing a second electrode; and
providing an electrolyte, wherein at least a portion of the first electrode and at least a portion of the second electrode contact the electrolyte.

20. The method of claim 19 in which providing the first electrode comprises providing a cathode.

21. The method of claim 19 in which providing the first electrode comprises providing an anode.

22. The method of claim 19 in which providing the plurality of particles comprises providing at least one of lithium iron phosphate, lithium iron oxide, lithium iron phosphorous oxide, lithium cobalt oxide, lithium manganese oxide, lithium nickel oxide, lithium cobalt manganese nickel, or lithium cobalt manganese nickel oxide.

23. The method of claim 19 in which disposing the electrochemically exfoliated graphene comprises disposing a plurality of flakes of electrochemically exfoliated graphene on the carbon.

24. The method of claim 19 in which the electrochemically exfoliated graphene forms about 0.001 wt % to about 5 wt % of the first electrode.

25. The method of claim 19 in which providing the first electrode comprises providing a first electrode that comprises an additive material including at least one of a conductive additive material, a bonding agent, a carbon material, or a solvent.

26. The method of claim 19 in which providing the first electrode comprises providing a first electrode that includes at least one of sulfur, silicon, tin, ceramic materials, or lithium sulfide.

27. The method of claim 19 in which producing the electrochemically exfoliated graphene comprises producing electrochemically exfoliated graphene that includes less than about 20 wt % oxygen.

28. The method of claim 19 in which producing the electrochemically exfoliated graphene comprises producing electrochemically exfoliated graphene having a permeability less than about 90% and a sheet resistance less than about 10 kΩ/sq.

* * * * *